US012765467B2

(12) United States Patent
Guiet et al.

(10) Patent No.: US 12,765,467 B2
(45) Date of Patent: Oct. 20, 2026

(54) BALER POWER MANAGEMENT

(71) Applicant: DEERE & COMPANY, Moline, IL (US)

(72) Inventors: Lionel Guiet, Gray (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/978,237

(22) Filed: Dec. 12, 2024

(65) Prior Publication Data

US 2025/0331468 A1 Oct. 30, 2025

(30) Foreign Application Priority Data

Apr. 26, 2024 (EP) .................................... 24172594
Apr. 26, 2024 (EP) .................................... 24172595

(51) Int. Cl.
*A01F 15/08* (2006.01)
*A01D 89/00* (2006.01)
*A01F 15/07* (2006.01)

(52) U.S. Cl.
CPC ........ *A01F 15/0841* (2013.01); *A01D 89/005* (2013.01); *A01F 15/07* (2013.01); *A01F 15/0833* (2013.01); *A01F 15/085* (2013.01)

(58) Field of Classification Search
CPC .. A01F 15/0841; A01F 15/07; A01F 15/0833; A01F 15/085
See application file for complete search history.

(56) References Cited

U.S. PATENT DOCUMENTS

2006/0283166 A1 12/2006 Schlesser
2011/0112729 A1 5/2011 Martin et al.
2014/0261023 A1 9/2014 Smith et al.
2014/0373737 A1 12/2014 Olander et al.
2020/0323147 A1* 10/2020 McClure ................ A01F 15/07
(Continued)

FOREIGN PATENT DOCUMENTS

EP 2745674 B1 11/2015
EP 2250875 B1 5/2019
(Continued)

OTHER PUBLICATIONS

Extended European Search Report and Written Opinion issued in European Patent Application No. 24172594.4 dated Nov. 12, 2024, in 13 pages.

(Continued)

*Primary Examiner* — Imran K Mustafa

(57) ABSTRACT

A combination of a towing vehicle and a baler, includes a drive train for driving the towing vehicle and a PTO unit. The combination includes a control unit connected to the PTO unit. The PTO unit is mechanically connected to the baler to drive a baling unit and a pick-up unit. The baling unit can be driven with a first energy value, and the pick-up unit can be driven with a second energy value. The control unit is configured to determine a total energy value from a energy consumption signal or a PTO consumption signal. The control unit is also configured to compare the total energy value with a baler consumption value and to set and/or adjust the PTO unit with a first actuating signal if the total energy value is different from the baler consumption value.

16 Claims, 4 Drawing Sheets

(56) References Cited

U.S. PATENT DOCUMENTS

| | | | | |
|---|---|---|---|---|
| 2022/0192098 | A1* | 6/2022 | Smith | A01F 15/0883 |
| 2023/0263099 | A1 | 8/2023 | Jadhao | |
| 2023/0354751 | A1 | 11/2023 | Ostermann et al. | |
| 2023/0363317 | A1 | 11/2023 | Shonk et al. | |

FOREIGN PATENT DOCUMENTS

| | | | |
|---|---|---|---|
| EP | 3721702 | A1 | 10/2020 |
| EP | 3837961 | A1 | 6/2021 |
| EP | 3900517 | A1 | 10/2021 |
| EP | 4018814 | A1 | 6/2022 |
| EP | 4165962 | A1 | 4/2023 |
| EP | 4201194 | A2 | 6/2023 |
| EP | 4272541 | A1 | 11/2023 |

OTHER PUBLICATIONS

Extended European Search Report and Written Opinion issued in European Patent Application No. 24172595.1 dated Nov. 12, 2024, in 12 pages.

* cited by examiner

BALER POWER MANAGEMENT

CROSS-REFERENCE TO RELATED APPLICATIONS

This application claims the benefit of European Patent Application EP24172595.1, filed on Apr. 26, 2024, and the benefit of European Patent Application EP24172594.4, filed in Apr. 26, 2024, the disclosures of which are hereby incorporated by reference.

TECHNICAL FIELD

The disclosure generally relates to a combination of a towing vehicle and a baler implement, and a method of operating the combination.

BACKGROUND

Balers, in particular round balers or square balers, are used to pick up and bale crop, for example straw, hay or the like. For this purpose, the baler may comprise a pick-up unit for picking up the crop, in particular for picking up the crop from a swath. In this instance, the crop lying on the ground can be picked up by the pick-up unit, in particular a pick-up. The baler may also comprise a baling unit. The baling unit may comprise a baling chamber with one or more baling means, such as rollers or a belt or a strap or a chain assembly or a band. The baling unit can receive the crop picked up by the pick-up unit and form or bale it into a bale. The baler can moreover comprise a conveying unit. The crop picked up by the pick-up unit can be guided into the baling unit, in particular the baling chamber, by means of the conveying unit, for example a rotor. The conveying unit can be designed as part of the pick-up unit or be disposed downstream of the pick-up unit, in particular disposed downstream in the conveying direction. The bale, in particular the round bale or the square bale, is formed in the baling unit. The fully formed bale can then be wrapped, in particular in the baling chamber, with a wrapping material, for example a mesh, film or twine. The fully formed bale or the fully wrapped bale can be unloaded or ejected via an ejection unit, for example an ejection flap or a rear part or a tailgate of the baler, in particular via the baling unit or baling chamber provided with an ejection unit. The pick-up unit, in particular the pick-up, can be driven to pick up crop. The baling unit, in particular the baling chamber and/or the baling means, may be driven to form or bale a bale within the baling chamber.

The baler can be part of a combination with a towing vehicle. The baler can be driven by the towing vehicle with a power and/or energy and/or a force and/or a torque and/or a rotational speed. The power and/or energy and/or force and/or torque and/or rotational speed may be transferred and/or distributed from the towing vehicle to the baler, in particular to the baling unit and/or the pick-up unit. The disadvantage of the known baler is that the process of understanding whether or not the energy requirement is at the maximum, i.e. the total energy, depends on the experience of the operator of the baler or the towing vehicle or a combination.

The present disclosure is therefore based on the object of proposing a combination and a method for operating a combination and a baler, by means of which the aforementioned problems are overcome,

SUMMARY

The disclosure proposes a towing vehicle-baler combination. The towing vehicle-baler combination comprises a towing vehicle and a baler. The towing vehicle comprises a PTO unit. The towing vehicle may comprise a drive train for driving the towing vehicle, in particular the towing vehicle-baler combination. The baler comprises a pick-up unit for picking up crop from the ground and feeding the crop into a baling unit. The baler also comprises the baling unit for receiving the crop from the pick-up unit and for baling or forming a bale. The combination comprises a control unit which is connected to the PTO unit, preferably connected for signalling and/or operatively coupled and/or connected for transmitting signals and/or conducting data. The control unit can be connected to the drive train, preferably connected for signalling and/or operatively coupled and/or connected for transmitting signals and/or conducting data. The PTO unit is mechanically connected to the baler to drive the baling unit and the pick-up unit. The baling unit can be driven with a first energy value and the pick-up unit can be driven with a second energy value. The control unit is configured to receive or determine an energy consumption signal or a PTO consumption signal and to determine a total energy value with the energy consumption signal or the PTO consumption signal. The control unit is also configured to compare the total energy value with a baler consumption value and to set and/or adjust the PTO unit with or based on a first actuating signal if the total energy value is different from the baler consumption value.

The control unit may preferably be designed as an integrated or common control unit of the combination. The control unit can be arranged on or at or in the towing vehicle or the baler. The control unit may be configured in particular to send a first actuating signal for setting and/or adjusting the PTO unit, in particular to the PTO unit, and to set and/or adjust the PTO unit with the first actuating signal if the total energy value is different from the baler consumption value.

The control unit may comprise a baler control unit and a towing vehicle control unit. The baler control unit and the towing vehicle control unit may be connected, preferably connected for signalling and/or operatively coupled and/or connected for transmitting signals and/or conducting data. The control unit or the towing vehicle control unit may be configured to set and/or adjust the PTO unit, preferably the first energy machine or the electric motor, with or on the basis of the first actuating signal, in order in particular to set and/or adjust, in particular to increase or reduce, the total energy value with or on the basis of the first actuating signal. The control unit or the towing vehicle control unit may be configured to set and/or adjust, in particular to increase or reduce, the energy and/or the torque and/or the force and/or the rotational speed of the PTO unit, preferably the first energy machine or the electric motor, with or on the basis of the first actuating signal. The baler can comprise the baler control unit (instead of the control unit). The baler control unit can be arranged at or on or in the baler. The baler control unit can be connected to the pick-up unit and the baling unit (instead of the control unit).

The baler control unit may be configured to receive the energy consumption signal or a PTO consumption signal, in particular from the towing vehicle control unit, and to determine a total energy value with the received signal. The baler control unit may also be configured to compare the total energy value with a baler consumption value, and to send a first actuating signal for setting and/or adjusting the PTO unit, in particular to the towing vehicle control unit, if the total energy value is different from the baler consumption value. The towing vehicle may comprise the towing vehicle control unit (instead of the control unit). The towing vehicle control unit may be arranged, in particular may be fastened or fastenable, at or on or in the towing vehicle. The towing vehicle control unit can be connected to the PTO unit. Alternatively or additionally, the towing vehicle control unit can be connected to the drive train. The towing vehicle control unit may be configured to receive or determine an energy consumption signal or a PTO consumption signal.

The baler control unit may be configured to receive the energy consumption signal or the PTO consumption signal from the towing vehicle control unit. The baler control unit may be configured to determine the total energy value with the energy consumption signal or the PTO consumption signal.

The towing vehicle control unit may be configured to receive the first actuating signal. The towing vehicle control unit may be configured to set and/or adjust the PTO unit, preferably the first energy machine, particularly preferably the electric motor, based on or with the first actuating signal. The towing vehicle control unit may be configured to receive the first actuating signal and to send the first actuating signal for setting and/or adjusting the PTO unit, in particular to the PTO unit, preferably the first energy machine, particularly preferably the electric motor, and to set and/or adjust the PTO unit, preferably the first energy machine, particularly preferably the electric motor, with the first actuating signal if the total energy value is different from the baler consumption value.

The control unit or the towing vehicle control unit may be configured in particular to set and/or adjust the total energy value, in particular an energy and/or a force and/or a torque and/or a rotational speed of the PTO unit, preferably the first energy machine or the electric motor, with the first actuating signal if the total energy value is different from the baler consumption value. The control unit or the towing vehicle control unit may be specifically configured to set and/or adjust the total energy value such that the baler consumption value is less than or equal to the total energy value. In other words, the combination may be operated with the control unit or the towing vehicle control unit in such a way that the total energy value is compared with the baler consumption value, and the PTO unit can be set and/or adjusted with or based on the first actuating signal if the total energy value is different from the baler consumption value.

Mechanically connected can be understood as meaning in particular driveable connected and/or coupled or coupleable, or mechanically coupled or mechanically coupleable. Mechanically connected, preferably driveable connected and/or coupled or coupleable, or mechanically coupled or mechanically coupleable, can therefore be understood as meaning in particular a connection of two components which makes it possible to transmit an energy and/or a force and/or a torque and/or a rotational speed from one component to the other, in particular mechanically. Further components or parts enabling such a transmission of energy and/or force and/or torque and/or transmission of a rotational speed between the two components can be provided between the two components.

In particular, the baler control unit may be configured to send the first actuating signal, in particular to the towing vehicle control unit, if the total energy value is less than the baler consumption value. The control unit or the towing vehicle control unit may be configured to increase the total energy value with or based on the first actuating signal such that the baler consumption value is less than or equal to the total energy value. Likewise, the baler control unit may be additionally or alternatively configured to send the first actuating signal, in particular to the towing vehicle control unit, if the total energy value is greater than the baler consumption value. The control unit or the towing vehicle control unit may be additionally or alternatively configured to reduce or increase the total energy value with or based on the first actuating signal, wherein the baler consumption value should be less than or equal to the total energy value.

The first actuating signal may be a signal for setting and/or adjusting the PTO unit, in particular an energy and/or a force and/or a torque and/or a rotational speed of the PTO unit, preferably the first energy machine or the electric motor. The total energy value and the first and second energy values and the baler consumption value can be an energy and/or a force and/or a torque and/or a rotational speed. The total energy value can correspond to a maximum energy currently available to the baler and/or a maximum force and/or a maximum torque and/or a maximum rotational speed. The total energy value can be determined with either the energy consumption signal or the PTO consumption signal.

The baler consumption value can correspond to a current demand of the baler for energy and/or force and/or torque and/or rotational speed. For example, the baler consumption value may be the energy and/or the force and/or the torque and/or the rotational speed required by the baler to maintain operation, in particular current operation, of the baler. The baler consumption value may increase as the size of the bale being formed increases. The energy requirement of the baler and thus the baler consumption value can depend on the size of the bale, i.e. the baler consumption value can increase linearly or incrementally depending on the size of the bale.

In particular, the first energy value may be a first energy and/or a first force and/or a first torque and/or a first rotational speed. The second energy value can be a second energy and/or a second force and/or a second torque and/or a second rotational speed.

In particular, the baler control unit may be configured to send the first actuating signal if the total energy value corresponds to one or more energy limit values relative to the baler consumption value or the total energy value is at one or more energy limit values relative to the baler consumption value. The towing vehicle control unit may be configured to receive the first actuating signal. The control unit or the towing vehicle control unit may be configured to set and/or adjust, in particular to increase or reduce, the energy and/or the torque and/or the force and/or the rotational speed of the PTO unit, preferably the first energy machine or the electric motor, with or on the basis of the first actuating signal if the total energy value corresponds to one or more energy limit values relative to the baler consumption value or the total energy value is at one or more energy limit values relative to the baler consumption value. The energy limit value or energy limit values may be less than and/or equal to or greater than and/or equal to the baler consumption value.

The control unit or the towing vehicle control unit may be configured to increase the energy and/or the torque and/or the force and/or the rotational speed of the PTO unit, preferably the first energy machine or the electric motor, with or on the basis of the first actuating signal if the total energy value is less than or equal to the energy limit value and the energy limit value is less than or equal to the baler consumption value, or if the total energy value is greater than or equal to the baler consumption value but less than the energy limit value. The total energy value may be increased until it is greater than or equal to the energy limit value(s).

Alternatively or additionally, the control unit or the towing vehicle control unit may be configured to reduce the energy and/or the torque and/or the force and/or the rotational speed of the PTO unit, preferably the first energy machine or the electric motor, with or on the basis of the first actuating signal if the total energy value is greater than the energy limit value(s) and the energy limit value is greater than or equal to the baler consumption value. The total energy value can be reduced until it is less than or equal to the energy limit value(s).

The baler control unit may be configured to send the first actuating signal if the total energy value is less than or equal to the energy limit value and the energy limit value is less than or equal to the baler consumption value, or if the total energy value is greater than or equal to the baler consumption value but less than the energy limit value. Alternatively or additionally, the baler control unit may be configured to send the first actuating signal if the total energy value is greater than the energy limit value(s) and the energy limit value is greater than or equal to the baler consumption value. The towing vehicle control unit may be configured to receive the first actuating signal.

The energy limit value can be an energy and/or a force and/or a torque and/or a rotational speed. The energy limit value can be a limit value that allows the first actuating signal to be sent in good time in order to maintain operation of the combination, in particular the baler.

The baler may be mechanically connected to the towing vehicle, in particular the baler may be coupled to the towing vehicle; for example, the combination may comprise the towing vehicle and the baler pulled by the towing vehicle by means of a drawbar. The towing vehicle control unit may be configured to determine an energy consumption signal or a PTO consumption signal. The towing vehicle control unit may be configured to send the energy consumption signal or the PTO consumption signal to the baler control unit, and the baler control unit is configured to receive the energy consumption signal or the PTO consumption signal from the towing vehicle control unit.

The towing vehicle can be an agricultural towing vehicle, in particular a tractor or a hauler. The towing vehicle can be arranged in front of the baler in a direction of travel. The towing vehicle can pull the baler. The drive train may comprise a motor and/or a transmission unit to drive the towing vehicle-baler combination. In addition, the towing vehicle may comprise the control unit or a towing vehicle control unit. The towing vehicle may also comprise one or more auxiliary units, such as a pump and/or a radiator, etc. The towing vehicle comprises the PTO unit, in particular a PTO transmission and/or a PTO or output shaft. The PTO unit may comprise a PTO transmission and/or a PTO or output shaft and a first energy machine, preferably an electric motor. The first energy machine can drive the PTO unit, in particular the PTO transmission and/or the PTO. The first energy machine, preferably the electric motor, can be mechanically connected to the PTO transmission and/or the PTO. In this case, the drive train drives only the towing vehicle and not the PTO unit. The PTO unit can therefore be driven independently of the drive train using the first energy machine. In addition, the PTO unit may be connected, preferably mechanically connected, to the baler in order to drive the baling unit and the pick-up unit, in particular the drive unit. Alternatively, the PTO unit can be driven by the drive train.

The control unit may be designed in particular as an integrated and/or common control unit. The control unit may be arranged on, at or in the combination, in particular the towing vehicle or the baler. Alternatively or additionally, the control unit may be designed as the towing vehicle control unit and the baler control unit. The towing vehicle control unit may be connected to the baler control unit, in particular connected for signalling and/or operatively coupled and/or connected for transmitting signals and/or conducting data, and/or may be controllable and/or settable and/or adjustable. In this case, the baler control unit may be arranged on, at or in the baler and the towing vehicle control unit may be arranged on, at or in the towing vehicle and/or assigned to it.

The motor can be an internal combustion engine or an electric motor, for example. The transmission unit may comprise a transmission. The drive train, in particular the motor and/or the transmission unit or the transmission, can be connected to the towing vehicle control unit or the control unit, in particular connected for signalling and/or operatively coupled and/or connected for transmitting signals and/or conducting data, and/or may be controllable and/or settable and/or adjustable. In particular, one or more ground engagement means of the towing vehicle can be mechanically connected to the motor directly or using the drive train, for example via the transmission unit or the transmission. The ground engagement means can be driven by the motor and/or the transmission unit in such a manner that the towing vehicle can be moved in a forward and/or reverse direction, for example. The first energy machine, in particular the electric motor, may be mechanically connected to a drive unit of the baler using or via the PTO unit; for example, the PTO and an input shaft of the drive unit may be mechanically connected. This allows the first energy machine to transmit an energy and/or a torque and/or a force and/or a rotational speed to the baler.

Alternatively or additionally, the drive train, in particular the motor, can be mechanically connected to a drive unit of the baler using or via the PTO unit; for example, the PTO and an input shaft of the drive unit can be mechanically connected. This allows the towing vehicle, preferably the drive train or the motor, to transmit an energy and/or a torque and/or a force and/or a rotational speed to the baler.

The baler can be mechanically connected to the towing vehicle via the input shaft and/or via a towing device, for example a drawbar and/or a coupling. For example, a towing vehicle frame of the towing vehicle can be connected to a baler frame of the baler via the or with the towing device. The towing vehicle can comprise the towing vehicle frame. The towing vehicle may comprise the ground engagement means. The ground engagement means can support and/or carry the towing vehicle on the ground. The towing vehicle frame of the towing vehicle can be supported on front and rear wheels. The ground engagement means can be wheels or tracks or chains. The ground engagement means, in particular the front wheels and rear wheels, may be steerable and/or movable.

The combination, in particular the towing vehicle, may comprise an input and output unit. The baler control unit and/or the towing vehicle control unit or the control unit may be connected to the input and output unit, in particular connected for signalling and/or operatively coupled and/or connected for transmitting signals and/or conducting data, and/or may be controllable and/or settable and/or adjustable. The input and output unit can be integrated in the baler control unit and/or the towing vehicle control unit or the control unit or vice versa. The operator of the combination or the towing vehicle or the baler can thus stipulate and/or be provided with a display of an output size or a density of the bale, for example at the push of a button or by means of a voice command, and/or can be provided with a display of the total energy value as well as the first and second energy values.

The drive train may be arranged and/or fastened on the towing vehicle frame, in particular may also be supported by the towing vehicle frame. The towing vehicle control unit or the control unit may be connected to the drive train, in particular the motor and/or the transmission unit or the transmission, and/or to the PTO unit, in particular connected for signalling and/or operatively coupled and/or connected for transmitting signals and/or conducting data. The combination, in particular the towing vehicle, may comprise a speed sensor for capturing a speed of the towing vehicle.

The towing vehicle control unit or the control unit may be configured to set and/or adjust and/or control the drive train, in particular the motor and/or the transmission unit or the transmission, and/or the PTO unit, for example by virtue of the towing vehicle control unit or the control unit setting and/or adjusting and/or controlling valves and/or actuators of these components. In particular, the towing vehicle control unit or the control unit may be configured to set and/or adjust and/or control the first energy machine, in particular the electric motor. The towing vehicle control unit or the control unit may be configured to set and/or adjust and/or control an energy and/or a force and/or a torque and/or a rotational speed of the first energy machine, in particular the electric motor.

The towing vehicle may comprise one or more PTO sensor(s) for capturing, in particular for directly or indirectly capturing, the PTO consumption signal. The PTO sensor may be connected to the towing vehicle control unit or the control unit, in particular connected for signalling and/or operatively coupled and/or connected for transmitting signals and/or conducting data. The PTO sensor can determine, in particular capture and/or detect, an energy and/or a force and/or a torque and/or a rotational speed at or in the PTO unit, in particular at or in the PTO transmission and/or the PTO, and/or the first energy machine, in particular in the form of a PTO consumption signal. The PTO consumption signal can therefore represent an outgoing energy and/or force and/or torque and/or rotational speed of the PTO unit, in particular the PTO or the PTO transmission, and/or the first energy machine. The PTO sensor can be a torque sensor and/or a rotational speed sensor and/or a force sensor and/or an energy sensor. The PTO sensor may be arranged on or in the PTO unit, in particular the PTO or the PTO transmission, and/or the first energy machine. The PTO sensor can send a signal, in particular the PTO consumption signal, to the baler control unit and/or a towing vehicle control unit or a control unit. The baler control unit and/or a towing vehicle control unit or a control unit may be configured to determine the total energy value using the PTO consumption signal. The PTO sensor(s) (first and/or second PTO sensor) may be arranged on the towing vehicle and/or the baler. Likewise, the total energy value can be determined using the energy consumption signal, for example by determining the maximum available energy and/or force and/or the torque and/or the rotational speed of the motor of a towing vehicle minus the peripheral consumption, e.g. by drive torque and/or power generation and/or HVAC, etc.

Alternatively, the towing vehicle control unit or the control unit may thus be configured to separately determine the available energy and/or the torque and/or the force and/or the rotational speed based on a consumption of the towing vehicle. The towing vehicle control unit or the control unit may thus be configured to determine the available energy and/or the torque and/or the force and/or the rotational speed based on the inputs from one or more sensors of the towing vehicle, as known, and may then, in particular, output the available energy consumption signal to the baler control unit. Regardless of the method used, the baler control unit and/or the towing vehicle control unit or the control unit can determine the total energy value that can be used by the baler without exceeding the available energy and/or the torque and/or the force and/or the rotational speed of the towing vehicle, in particular the motor. Optionally or additionally, the towing vehicle control unit or the control unit can determine an energy consumption signal, for example using parameters of the drive train and/or the auxiliary unit or units. The energy consumption signal can therefore be an energy and/or force and/or torque and/or rotational speed of the towing vehicle, which is/are available for a drive of the baler.

The combination may comprise one or more GPS devices for determining the position of the combination, in particular the towing vehicle and/or the baler, in particular in the form of a position signal. The towing vehicle control unit or the control unit may be connected to the GPS device, in particular connected for signalling and/or operatively coupled and/or connected for transmitting signals and/or conducting data. The towing vehicle control unit or the control unit may be configured to receive the position signal from the GPS device and/or the GPS device may send the position signal to the towing vehicle control unit or the control unit. The towing vehicle control unit or the control unit can transmit the position signal to a central server using a radio module and the central server can determine and/or ascertain an unloading position, for example, and the central server can transmit the unloading position to the towing vehicle control unit or the control unit. The GPS device can be used to send and/or receive, and/or in particular calculate, a position or the position signal. The GPS device can comprise, for example, a GPS antenna and a memory. The position of the combination, in particular the towing vehicle and/or the baler, can be stored in the memory. Likewise, a position of the swath or the target line of the swath, which may be known, for example, from previous tilling procedures on the swath, can be stored.

In particular, the combination, particularly the towing vehicle and/or the baler, can comprise one or more capture devices, for example in the form of a camera. The capture device can be arranged or attached, for example, on the front and/or rear of the towing vehicle and/or the front and/or rear of the baler. The capture device can capture, in particular optically capture, the swath in the form of a capture signal, for example an image, a video signal or a distance. The capture device may be connected to the control unit or the towing vehicle control unit and/or the baler control unit and/or an image processing system. The capture device can send the capture signal to the control unit or the towing vehicle control unit and/or the baler control unit and/or the image processing system. The image processing system and/or the control unit or the towing vehicle control unit and/or the baler control unit can determine a target line of the swath, in particular the longitudinal center axis of the swath. This makes it possible to optimally pick up and process the crop, with the result that the baler consumption value, but especially also the first and second energy values, and/or the output size and/or the density, can be kept substantially constant or constant.

The baler can be a square baler for forming square bales from crop, or a round baler for forming round bales from crop. The baler may comprise a baler frame. The baler can also be integrated in a towing vehicle, i.e. the combination can be designed as a self-propelled baler. The baler may be supported on the ground by wheels. The baling unit of the baler can comprise a variable-size baling chamber or a variable baling chamber. The baler with a variable-size baling chamber may comprise one or more baling means, wherein the baling means may be, in particular, in the form of a belt or strap or chain assembly or band. The baling means can be driven indirectly in the variable-size baler, for example, via rollers and/or chains and/or shafts and/or gearwheels, in particular using the drive unit. The baler may equally also comprise a size-invariable baling chamber. In this instance, a baling means may be in the form of a baling roller, in particular a multiplicity of baling rollers running parallel to one another, for baling the crop. The axes of rotation of the baling rollers may lie on an arc in the case of a closed ejection unit, and at least one of the baling rollers may be driven. The arrangement of the baling rollers in the baling chamber may correspond to a cylindrical shape, such that the baling rollers are arranged cylindrically about the round bale and form a cylindrical circumferential surface. The baling means can be driven in the size-invariable baler, for example, via chains and/or shafts and/or gearwheels, in particular using the drive unit.

The baler, especially the baling unit, may comprise a first actuator for setting and/or adjusting the baling unit. The first actuator may be designed to set and/or adjust the baling unit, preferably the baling means, particularly preferably the pressure or the bale forming pressure of the baling means. The first actuator can therefore be used to set and/or adjust the density of the bale, in particular by setting and/or adjusting the pressure or bale forming pressure of the baling means. In addition, the first energy value of the baling unit can be reduced by means of or with a reduction in the density of the bale. Likewise, the first energy value of the baling unit can be increased by means of or with an increase in the density of the bale.

The first actuator may be connected to the control unit or the baler control unit, in particular connected for signalling and/or operatively coupled and/or connected for transmitting signals and/or conducting data. In particular, the baler, in particular the baling unit, may comprise a first valve or a first valve arrangement, in particular a first control valve, for controlling and/or setting and/or adjusting the first actuator. The control unit or the baler control unit may be connected to the valve or the valve arrangement, in particular connected for signalling and/or operatively coupled and/or connected for transmitting signals and/or conducting data. The control unit or the baler control unit may be configured to control and/or set and/or adjust the first actuator, in particular via or using the valve or the valve arrangement. The first actuator can be designed, for example, in the form of a hydraulic cylinder or pneumatic cylinder or lifting cushion or screw drive or rack-and-pinion drive or electric cylinder. The baler, in particular the drive unit of the baler, can be driven, for example, using the PTO unit of the towing vehicle, to which the baler or the drive unit can be mechanically connected.

The baler comprises the pick-up unit, in particular a pick-up, for picking up crop. The crop can be arranged as a swath. The pick-up unit can pick up the crop, in particular in the form of the swath.

The baler, in particular the pick-up unit, may comprise a second actuator for setting and/or adjusting the pick-up unit. The second actuator may be designed to set and/or adjust the pick-up unit. The second actuator can be connected to the control unit or the baler control unit, particularly preferably connected for signalling and/or operatively coupled and/or connected for transmitting signals and/or conducting data. In particular, the baler, in particular the pick-up unit, may comprise a second valve or a second valve arrangement, in particular a second control valve, for controlling and/or setting and/or adjusting the second actuator. The control unit or the baler control unit can be connected to the second actuator via the second valve or the second valve arrangement, particularly preferably connected for signalling and/or operatively coupled and/or connected for transmitting signals and/or conducting data. The baler control unit may be configured to control and/or set and/or adjust the second actuator, in particular via the second valve or the second valve arrangement. The control unit or the baler control unit may be configured to set and/or adjust the pick-up unit, preferably a height of the pick-up unit, on the basis of a first control signal. The second actuator can be designed, for example, in the form of a hydraulic cylinder or pneumatic cylinder or lifting cushion or screw drive or rack-and-pinion drive or electric cylinder.

The baler may moreover comprise a conveyor unit, for example a rotor and/or a conveyor belt. The baler, in particular the conveyor unit, may comprise a third actuator for setting and/or adjusting the conveyor unit. The third actuator may be designed to set and/or adjust the conveyor unit. The third actuator can be connected to the control unit or the baler control unit, particularly preferably connected for signalling and/or operatively coupled and/or connected for transmitting signals and/or conducting data. In particular, the baler, in particular the conveyor unit, may comprise a third valve or a third valve arrangement, in particular a third control valve, for controlling and/or setting and/or adjusting the third actuator. The control unit or the baler control unit can be connected to the third actuator via the third valve or the third valve arrangement, preferably connected for signalling and/or operatively coupled and/or connected for transmitting signals and/or conducting data. The control unit or the baler control unit may be configured to control and/or set and/or adjust the third actuator, in particular via the third valve or the third valve arrangement. The baler control unit may be configured to set and/or adjust the conveyor unit, preferably a conveying quantity of the conveyor unit, on the basis of a second control signal. The third actuator can be designed, for example, in the form of a hydraulic cylinder or pneumatic cylinder or lifting cushion or screw drive or rack-and-pinion drive or electric cylinder.

The bale can be formed using the baling unit, in particular in a baling phase. The baler may comprise a wrapping unit for wrapping the fully formed bale with a wrapping material, for example a mesh, film or twine. The fully formed bale can be wrapped with the wrapping material, in particular in the baling unit or baling chamber. The baler may comprise an ejection unit, for example an ejection flap or a rear part or a tailgate of the baler. The bale, preferably the fully formed bale or the fully wrapped bale, can be unloaded or ejected via the ejection unit, in particular via the baling unit or baling chamber provided with the ejection unit. The ejection unit can comprise part of the baling chamber, in particular part of the baling means, and/or be formed as part of the baling chamber. The baling chamber may be arranged on the baler frame, preferably connected thereto and/or fastened thereto. The pick-up unit for picking up or for collecting crop lying or standing on a field, and/or for transporting the crop into the baling chamber may likewise be arranged on the baler frame, preferably mechanically connected thereto and/or fastened thereto. The baler, in particular the drive unit and/or the baling chamber and/or the pick-up unit, may comprise one or more overload units in order to limit the maximum processable energy or torque or force or rotational speed of the respective unit.

During operation of the combination, the control unit or the baler control unit is configured to detect a possible overload or underload of the baler, using the energy consumption signal or the PTO consumption signal or the total energy value determined and a comparison of the total energy value with the baler consumption value, and to set and/or adjust the PTO unit with or based on the first actuating signal if the total energy value is different from the baler consumption value. Alternatively, the baler control unit may be configured to detect a possible overload or underload of the baler, using the energy consumption signal or the PTO consumption signal or the total energy value determined and a comparison of the total energy value with the baler consumption value, and to send the first actuating signal to the towing vehicle control unit if the total energy value is different from the baler consumption value. The towing vehicle control unit may be configured to set and/or adjust the PTO unit with or based on the first actuating signal.

The control unit or alternatively the baler control unit and the towing vehicle control unit may be configured to adapt the total energy on the basis of the first actuating signal if the total energy value is different from the baler consumption value. If the total energy value is less than or equal to the baler consumption value, indicating that there is not enough energy, force, torque, or rotational speed to maintain operation of the baler with the current settings, the control unit or alternatively the baler control unit and the towing vehicle control unit can output the first actuating signal in order to increase the total energy value using the PTO unit. Additionally or alternatively, if the total energy value is greater than the baler consumption value, indicating that more energy, force, torque, or rotational speed is available than is needed to maintain operation of the baler with the current settings, the control unit or alternatively the baler control unit and the towing vehicle control unit can output the first actuating signal in order to reduce the total energy value using the PTO unit.

This makes it possible to avoid an overload or underload of the baler. In other words, the energy consumption of the baler can be adapted to the maximum total energy available (total energy value). A further advantage of the present disclosure is that it is possible for an operator or the baler control unit and/or the towing vehicle control unit or the control unit to make better decisions regarding a possibly impending overload or underload situation.

In a configuration of the disclosure, the control unit is configured to set and/or adjust a speed of the combination with or based on a driving signal if the total energy value is different from the baler consumption value. The control unit can be connected to the drive train, in particular the motor and/or the transmission unit or the transmission, preferably connected for signalling and/or operatively coupled and/or connected for transmitting signals and/or conducting data. For this purpose, the control unit can be connected, for example, to valves or actuators of the motor or the transmission, preferably connected for signalling and/or operatively coupled and/or connected for transmitting signals and/or conducting data. The control unit may be configured to send the driving signal for setting and/or adjusting the speed, in particular to the drive train. The baler control unit can be configured to receive the energy consumption signal or a PTO consumption signal and to determine a total energy value with the received signal. The baler control unit may also be configured to compare the total energy value with a baler consumption value, and to send the driving signal for setting and/or adjusting the speed of the combination, in particular to the towing vehicle control unit, if the total energy value is different from the baler consumption value. The towing vehicle control unit may be configured to receive the driving signal. The towing vehicle control unit may be configured to set and/or adjust the drive train with or based on the driving signal. The towing vehicle control unit may be configured to send the driving signal for setting and/or adjusting the drive train, in particular to the drive train. The towing vehicle control unit or the control unit may be configured to set and/or adjust and/or control the drive train, in particular the motor and/or the transmission unit or the transmission, of the towing vehicle with the driving signal and to set and/or adjust, in particular to increase or reduce, a speed of the towing vehicle with or based on the driving signal. Alternatively or additionally, however, the towing vehicle control unit or the control unit may also be configured to set and/or to adjust the drive train, in particular the motor and/or the transmission unit or the transmission, of the towing vehicle with a further control signal, based on the driving signal. This allows the speed of the towing vehicle to be changed, in particular increased or reduced, allowing the baler consumption value to be adapted, in particular to the total energy value, or changed.

The speed of the combination or the towing vehicle can be changed with the driving signal or the further control signal by increasing or reducing an energy and/or a force and/or a torque and/or a rotational speed of the drive train, in particular the motor. Additionally or alternatively, a gear of the transmission unit or the transmission, in particular a gear ratio, can be set and/or adjusted. In the case of a continuously variable transmission, an energy and/or a force and/or a torque and/or a rotational speed of the transmission can be increased or reduced. In other words, the towing vehicle control unit or the control unit can set and/or adjust the motor and/or the transmission unit, using or with or based on the driving signal or the further control signal, in such a way that the towing vehicle changes its speed and thus the baler consumption value, in particular the first energy value of the baling unit and/or the second energy value of the pick-up unit. The baler consumption value can thus be approximated to the total energy value; in particular, the baler consumption value can be set and/or adjusted in such a way that it becomes equal to the total energy value. The speed can be adapted automatically or by an operator of the combination.

The first and/or second energy value and/or the baler consumption value can be increased by increasing the speed of the towing vehicle and can be reduced by reducing the speed of the towing vehicle. In particular, the second energy value is affected by the density of the harvested crop, in particular the swath. This allows the speed of the towing vehicle to be increased as a low-density swath approaches in order to maintain an even crop throughput. Conversely, the speed of the towing vehicle can be reduced as a high-density swath approaches in order to maintain an even crop throughput. Overall, this makes it possible to avoid an overload or underload of the baler or the combination.

Advantageously, this makes it possible, in particular during operation of the combination, to detect a possible overload or underload of the baler, using the energy consumption signal or the PTO consumption signal or the total energy value determined and a comparison of the total energy value with the baler consumption value, and to set and/or adjust the speed of the combination with or based on the driving signal in order to increase or reduce the baler consumption value. This makes it possible to avoid an overload or underload of the combination. In other words, the energy consumption of the baler can be adapted to the maximum total energy available (total energy value). A further advantage of the present disclosure is that it is possible for an operator or the baler control unit and/or the towing vehicle control unit or the control unit to make better decisions regarding a possibly impending overload situation.

In a configuration of the disclosure, the control unit is configured to compare the total energy value with a baler consumption value and to set and/or adjust a density of the bale, in particular the pressure or the bale forming pressure, with or based on a second actuating signal if the total energy value is different from the baler consumption value. The control unit may be connected to the baling unit, in particular the first actuator or the first valve or the first valve arrangement, in particular the first control valve, in particular connected for signalling and/or operatively coupled and/or connected for transmitting signals and/or conducting data.

The control unit may be configured to send the second actuating signal for setting and/or adjusting the density of the bale, in particular to the first actuator or the first valve or the first valve arrangement, and/or to set and/or adjust the first actuator or the first valve or the first valve arrangement with the second actuating signal if the total energy value is different from the baler consumption value. Likewise, the baler control unit may be configured to compare the total energy value with a baler consumption value and to send the second actuating signal for setting and/or adjusting the density of the bale, in particular to the first actuator or the first valve or the first valve arrangement, and/or to set and/or adjust the first actuator or the first valve or the first valve arrangement with the second actuating signal if the total energy value is different from the baler consumption value. The control unit or the baler control unit may be configured to set and/or adjust the baling unit, preferably the density of the bale, particularly preferably the pressure or bale forming pressure of the baling means, with or based on or depending on the second actuating signal, in particular if the total energy value is different from the baler consumption value. The control unit or the baler control unit can therefore adapt the bale forming pressure, in particular increase the pressure or bale forming pressure, thereby increasing the first energy value, or reduce the pressure or bale forming pressure, thereby reducing the first energy value, with or based on the second actuating signal.

In a configuration of the disclosure, the baler consumption value is equal to the sum of the first and second energy values. In other words, the baler consumption value corresponds to the sum of the first and second energy values. Therefore, $$E_{Baler} = E_1 + E_2$$

with $E_{Baler}$=Baler consumption value $E_1$=First energy value $E_2$=Second energy value However, if the baler comprises further units, the baler consumption value can also be defined as follows:

$$E_{Baler} = E_1 + E_2 + \ldots + E_n$$

with $E_{Baler}$=Baler consumption value $E_1$=First energy value, $E_2$=Second energy value, $E_n$=n-th energy value of the n-th unit, e.g. conveyor unit and/or rotor etc.

The baler control unit and/or towing vehicle control unit or the control unit may therefore be configured to compare the total energy value with the sum of the first and second energy values. In addition, the baler control unit and/or towing vehicle control unit or the control unit may be configured to ascertain, in particular to calculate and/or determine, the sum of the first and second energy values. Advantageously, the above-mentioned advantages can thus be achieved, that is to say an overload or underload of the baler can be avoided.

In a configuration of the disclosure, the combination, in particular the baler, comprises a first sensor for capturing, in particular for directly or indirectly capturing, the first energy value of the baling unit and the second energy value of the pick-up unit, in particular in the form of a first energy signal. In particular, the first sensor can capture or determine the sum of the first and second energy values. The combination, in particular the baler, may comprise one or more first sensors. The first sensor may be a torque sensor and/or a rotational speed sensor and/or a force sensor and/or an energy sensor. The first sensor can capture an energy and/or a force and/or a torque and/or a rotational speed of the pick-up unit and/or the baling unit or alternatively the drive unit. The first sensor may be arranged on or in the drive unit, in particular on the input shaft and/or on or in an overload clutch of the drive unit and/or on an output shaft or a first drive shaft and/or on or in a transmission device. The first sensor sends signals to the control unit or baler control unit. The control unit or baler control unit may be connected to the first sensor, in particular connected for signalling and/or operatively coupled and/or connected for transmitting signals and/or conducting data. In addition, the control unit or baler control unit may be configured to determine the sum of the first and second energy values, in particular calculate the sum of the first and second energy values, using the signal or signals or with the signal or signals from the first sensor, in particular with or using the first energy signal. The control unit or the baler control unit may be configured to receive the first energy signal from the first sensor.

In a configuration of the disclosure, the combination, in particular the baler, comprises a first sensor for capturing, in particular for directly or indirectly capturing, the first energy value of the baling unit, in particular in the form of a first energy signal, and a second sensor for capturing, in particular for directly or indirectly capturing, the second energy value of the pick-up unit, in particular in the form of a second energy signal. The combination, in particular the baler, may comprise one or more first sensors. The combination, in particular the baler, may comprise one or more second sensors. The first sensor may be a torque sensor and/or a rotational speed sensor and/or a force sensor and/or an energy sensor. The first sensor can capture an energy and/or a force and/or a torque and/or a rotational speed of the baling unit and/or the drive unit, in particular of components of the drive unit. The second sensor may be a torque sensor and/or a rotational speed sensor and/or a force sensor and/or an energy sensor and/or a flow sensor. The second sensor can capture an energy and/or a force and/or a torque and/or a rotational speed of the pick-up unit and/or the drive unit. The first sensor may be arranged on or in the baling unit and/or the drive unit, in particular the first drive shaft and/or on or in the transmission device. The first sensor sends signals to the control unit or the baler control unit. The second sensor may be arranged on or in the pick-up unit and/or the drive unit, in particular on a second drive shaft and/or on or in the transmission device. Alternatively or additionally, the second sensor, which may be designed in particular as a flow sensor or torque sensor, may be arranged on or in the pick-up unit. The second sensor provides signals to the control unit or the baler control unit. The control unit or the baler control unit is connected to the first and second sensors, in particular connected for signalling and/or operatively coupled and/or connected for transmitting signals and/or conducting data. In addition, the control unit or the baler control unit is configured to determine, in particular calculate, the first and second energy values and/or the sum of the first and second energy values using or with the signals from the first and second sensors, in particular with or using the first and second energy signals. Likewise, the control unit or the baler control unit may be configured to receive the first energy signal from the first sensor and the second energy signal from the second sensor. This advantageously makes it possible to accurately capture the first and second energy values.

In a configuration of the disclosure, the combination, in particular the baler, comprises a drive unit which is mechanically connected to the baling unit and the pick-up unit. The baling unit and the pick-up unit can be driven with or via the drive unit. The drive unit may comprise an input shaft and/or an overload clutch and/or a first and second drive shaft. In this case, the baling unit can be driven by or using the drive unit with the first drive shaft, in particular with a first energy value. The pick-up unit can be driven by or using the drive unit with the second drive shaft, in particular with the second energy value. However, the drive unit may also comprise only the input shaft and/or an overload clutch and an output shaft, wherein the baling unit and the pick-up unit can be driven by or using the drive unit with the output shaft. The drive unit may be driven by or using the PTO unit of the towing vehicle, which may be connected and/or coupled to the baler. In particular, the input shaft can be mechanically connected to the PTO of the towing vehicle and can be driven by or using the PTO. The overload clutch may be arranged on or in the input shaft, or the input shaft may comprise the overload clutch. In the event of an overload situation, the overload clutch can disconnect the input shaft from the towing vehicle, in particular the PTO unit. This allows the driven parts of the baler to be disconnected from the towing vehicle. An advantage of the present disclosure is that actuation of the overload clutch can be avoided. The drive unit may comprise a transmission device. The transmission device can be mechanically connected to the input shaft and/or can be driven via or with the input shaft. The transmission device can be mechanically connected to the first and/or second drive shaft. However, the transmission device can also be mechanically connected to the output shaft. The first and/or second drive shaft or the output shaft may be driven via or with the transmission device. However, the transmission device can also likewise drive the baling unit and/or the pick-up unit directly. The transmission device may comprise a bevel gear or bevel gear transmission. The first and/or second drive shaft or the output shaft can start at or in the transmission device. The transmission ratio between the input shaft and the first drive shaft may differ from the transmission ratio of the input shaft and the second drive shaft by virtue of adaptation of the bevel gear or bevel gear transmission. A total energy, for example a power and/or energy and/or a torque and/or a rotational speed, can be distributed and/or transferred from the drive unit to the baling unit and/or pick-up unit. The drive unit may be mechanically connected to the baling unit, in particular the baling means, and the pick-up unit by means of one or more gearwheels and/or shafts.

In a configuration of the disclosure, the first energy value can be determined with the first sensor on the first drive shaft of the drive unit and the second energy value can be determined with the second sensor on a second drive shaft. However, the sum of the first and second energy values can also be determined with the first sensor on an output shaft or transmission unit of the drive unit. This advantageously makes it possible to capture the first and second energy values or the sum thereof in a simple manner.

In a configuration of the disclosure, the control unit, or in particular the baler control unit and/or towing vehicle control unit, is configured to set an output size of the fully formed bale, wherein the output size defines or stipulates when the fully formed bale is output, and to set and/or adjust the PTO unit with or based on the first actuating signal and/or to set and/or adjust a speed of the combination with or based on the driving signal and/or to set and/or adjust a density of the bale with or based on the second actuating signal, and not to change the output size, or without changing the output size, if the total energy value differs from the baler consumption value.

The control unit, or in particular the baler control unit and/or towing vehicle control unit, can thus be configured to adapt the baler consumption value to the total energy value, particularly preferably to set and/or adjust the baler consumption value in such a manner that the baler consumption value is less than or equal to the total energy value, and/or to adapt the total energy value to the baler consumption value, particularly preferably to set and/or adjust the total energy value in such a manner that the total energy value is greater than or equal to the baler consumption value, without changing the output size of the fully formed bale. The control unit, or in particular the towing vehicle control unit, may be configured in particular to set and/or adjust the PTO unit with the first actuating signal in such a manner that the total energy value is greater than the baler consumption value, without changing the output size, if the total energy value is less than the baler consumption value. In addition, the control unit, or in particular the baler control unit, may be configured to reduce the density of the bale with the second actuating signal in order to change the baler consumption value, in particular the first energy value, without changing the output size, if the total energy value is less than the baler consumption value. In addition, the control unit, or in particular the towing vehicle control unit, may be configured to reduce the speed of the combination with the driving signal if the total energy value is less than the baler consumption value in order to change the baler consumption value, without changing the output size, if the total energy value is less than the baler consumption value. The output size may be a volume and/or diameter and/or a radius and/or a mass of the bale and/or a tension of the baling means and/or a distribution of the crop, in particular a lateral distribution of the crop, in the swath. The first and second energy values, especially also their sum, can therefore depend on the output size. The baler may comprise one or more bale sensors for capturing the output size. The bale sensor(s) can capture the output size, especially in the form of a bale signal. The bale sensor(s) can be arranged on or in the baler, in particular on or in the baling unit and/or the pick-up unit. The bale signal can be sent by the bale sensor(s) to the baler control unit, or can be received by the baler control unit from the bale sensor(s), respectively. The baler control unit may be configured to use the bale signal to determine, in particular calculate, the volume and/or the diameter and/or the radius and/or the mass of the bale, and/or the tension of the baling means and/or the distribution of the crop, in particular a lateral distribution of the crop. The bale sensor(s) may be, for example, a weight sensor and/or a pressure sensor and/or a potentiometer and/or a distance sensor. As a result, the total energy value and/or the baler consumption value and/or the bale forming pressure, in particular the density of the bale, can advantageously be changed, in particular increased or reduced, without the output size changing. In addition, bale formation does not have to be interrupted due to an overload of the baler, for example in order to proactively prevent the motor of the towing vehicle from stalling, and the bale can be produced at the same time with the output size that has been set.

In a configuration of the disclosure, the control unit is configured to set and/or adjust, in particular maintain a density of the bale, which is formed in particular in the baling unit, with or based on the first actuating signal and/or the driving signal and/or the second actuating signal if the first energy value is different from, in particular less than or greater than, a presently required energy value of the baling unit (energy threshold of the baling unit). The total energy value may be different from or equal to the baler consumption value. The presently required energy value or energy threshold may be the energy and/or the force and/or the torque and/or the rotational speed required by the baling unit to maintain a density, in particular a constant density, of the bale formed in the baling unit.

In particular, the baler control unit may be configured to send the first actuating signal and/or the driving signal and/or the second actuating signal, in particular to the towing vehicle control unit, if the first energy value is different from a presently required energy value of the baling unit. The towing vehicle control unit may be configured to set and/or adjust, in particular maintain, a density of the bale, which is formed in particular in the baling unit, with or based on the first actuating signal and/or the driving signal and/or the second actuating signal if the first energy value is different from a presently required energy value of the baling unit.

The need for energy and/or force and/or torque and/or rotational speed for maintaining the density of the bale may change, especially increase, with increasing size of the bale being formed. The control unit, or in particular the baler control unit and the towing vehicle control unit, can therefore be configured to set and/or adjust the total energy value and/or the baler consumption value, and thus in particular the first energy value, and/or the presently required energy value during bale formation.

The following use cases may arise:

1.) The total energy value may be greater than the baler consumption value, and the first energy value may be less than the presently required energy value.

In this case, the baler control unit may be configured to send the driving signal and/or the first and/or second actuating signal, in particular to the towing vehicle control unit. Furthermore, the control unit or the baler control unit and/or the towing vehicle control unit may be configured to increase, in particular, the first energy value with the driving signal and/or the first and/or second actuating signal, with the result that the first energy value approaches or is equal to the presently required energy value of the baling unit (energy threshold of the baling unit).

2.) The total energy value may be greater than the baler consumption value, and the first energy value may be greater than the presently required energy value.

In this case, the baler control unit may be configured to send the driving signal and/or the first and/or second actuating signal, in particular to the towing vehicle control unit. Furthermore, the control unit or the baler control unit and/or the towing vehicle control unit may be configured to reduce the first energy value with the driving signal and/or the first and/or second actuating signal, with the result that the first energy value approaches or is equal to the presently required energy value of the baling unit (energy threshold of the baling unit). 3.) The total energy value may be less than the baler consumption value, and the first energy value may be less than the presently required energy value.

In this case, the baler control unit may be configured to send the driving signal and/or the first and/or second actuating signal, in particular to the towing vehicle control unit. Furthermore, the control unit or the baler control unit and/or the towing vehicle control unit may be configured to reduce the baler consumption value with the driving signal and/or to increase the total energy value with the first actuating signal and/or to increase the first energy value with the second actuating signal, with the result that the first energy value approaches or is equal to the presently required energy value of the baling unit (energy threshold of the baling unit).

4.) The total energy value may be less than the baler consumption value, and the first energy value may be greater than the presently required energy value.

In this case, the baler control unit may be configured to send the driving signal and/or the first and/or second actuating signal, in particular to the towing vehicle control unit. Furthermore, the control unit or the baler control unit and/or the towing vehicle control unit may be configured to reduce the baler consumption value with the driving signal and/or to increase the total energy value with the first actuating signal and/or to reduce the first energy value with the second actuating signal, with the result that the first energy value approaches or is equal to the presently required energy value of the baling unit (energy threshold of the baling unit).

5.) The total energy value can be equal to the baler consumption value, and the first energy value can be greater than the presently required energy value.

In this case, the baler control unit may be configured to send the actuating signal, in particular to the towing vehicle control unit. Furthermore, the control unit or the baler control unit and/or the towing vehicle control unit may be configured to reduce the first energy value with the actuating signal, with the result that the first energy value approaches or is equal to the presently required energy value of the baling unit (energy threshold of the baling unit).

6.) The total energy value can be equal to the baler consumption value, and the first energy value can be less than the presently required energy value.

In this case, the baler control unit may be configured to send the driving signal and/or the first and/or second actuating signal, in particular to the towing vehicle control unit. Furthermore, the control unit or the baler control unit and/or the towing vehicle control unit may be configured to reduce the baler consumption value with the driving signal, and thus reduce the first and second energy values, and/or to increase the total energy value with the first actuating signal and/or to increase the first energy value with the second actuating signal, with the result that the first energy value approaches or is equal to the presently required energy value of the baling unit (energy threshold of the baling unit).

As a result, the density of the bale formed in the baling unit can advantageously be maintained and at the same time an overload or underload of the baler can be avoided, and, for example, stalling of a motor of a towing vehicle can be proactively prevented. In addition, it is possible to advantageously achieve the situation in which the bale has a pre-definable density, in particular a pre-definable constant density.

In a configuration of the disclosure, the control unit is configured to set and/or adjust and/or control an input and output unit with or based on the driving signal, with the result that the input and output unit signals to the operator to change the speed of the towing vehicle. The control unit may be additionally or alternatively configured to emit or send an operator signal to the input and output unit with or based on the driving signal. The input and output unit may be configured to signal to the operator to change the speed of the towing vehicle with or based on the operator signal. The operator can set and/or adjust and/or control the drive train of the towing vehicle, in particular the motor and/or the transmission unit or the transmission, based on the instructions or signals from the input and output unit, and to set and/or adjust a speed of the towing vehicle. For example, the operator can emit the control signal to the drive train, in particular the motor and/or the transmission unit or the transmission of the towing vehicle. This allows the speed of the towing vehicle to be changed, in particular increased or reduced, allowing the total energy value to be adapted. The first and/or second energy value and/or the baler consumption value can be increased by increasing the speed of the towing vehicle and can be reduced by reducing the speed of the towing vehicle. In particular, the second energy value is affected by the density of the harvested crop, in particular the swath. This allows the speed of the towing vehicle to be increased as a low-density swath approaches in order to maintain an even crop throughput. Conversely, the speed of the towing vehicle can be reduced as a high-density swath approaches in order to maintain an even crop throughput. Overall, this makes it possible to avoid an overload or underload of the baler or the combination.

The disclosure furthermore relates to a method for operating a combination. The method may comprise the following steps. The control unit or the towing vehicle control unit can determine an energy consumption signal or a PTO consumption signal and send it to the baler control unit in particular. The baler control unit may receive the energy consumption signal or the PTO consumption signal from the towing vehicle control unit. The baler control unit or the control unit can determine a total energy value with the energy consumption signal or the PTO consumption signal. The control unit or the baler control unit can also compare the total energy value with a baler consumption value and can set and/or adjust the PTO unit with (or based on) the first actuating signal if the total energy value is different from the baler consumption value. The method has all the advantages of the combination according to the disclosure.

The disclosure further relates to a baler. The baler includes:

a pick-up unit for picking up crop from the ground and feeding the crop into a baling unit, and the baling unit for receiving the crop, in particular from the pick-up unit, and for baling or forming a bale, and a control unit or a baler control unit which is connected to the pick-up unit and the baling unit, preferably connected for signalling and/or operatively coupled and/or connected for transmitting signals and/or conducting data.

The pick-up unit and the baling unit can be controlled and/or set and/or adjusted using the control unit or the baler control unit.

Furthermore, the baling unit can be driven and/or operated with a first energy value and the pick-up unit can be driven and/or operated with a second energy value. The control unit or the baler control unit is configured:

to receive an energy consumption signal or a PTO consumption signal, and to ascertain, in particular determine and/or calculate, a total energy value with the received signal.

The control unit or the baler control unit is also configured:

to compare the total energy value with a baler consumption value, and to send a first actuating signal for setting and/or adjusting the total energy value if the total energy value is different from the baler consumption value.

The control unit or the baler control unit may additionally be configured to send a second actuating signal for setting and/or adjusting the density of the bale and/or to send a driving signal if the total energy value is different from the baler consumption value.

The first actuator and/or the second actuator and/or the third actuator and/or the GPS device and/or the input and output unit and/or the capture device and/or the image processing system and/or all other sensors, for example the bale sensor(s) and/or wrapping sensors and/or the ejection flap sensor and/or the first and/or second sensor and/or the PTO sensor(s) and/or the speed sensor, can be operated, preferably controlled and/or regulated, particularly preferably controlled and/or set and/or adjusted, using the baler control unit and/or the towing vehicle control unit or the control unit. The baler control unit and the towing vehicle control unit may be connected, in particular connected for signalling and/or operatively coupled and/or connected for transmitting signals and/or conducting data. The control unit or the baler control unit and the towing vehicle control unit can provide signals for controlling the operation of the combination, especially the baler and/or the towing vehicle. The signals can be expediently provided via a suitable data communication network, for example one that conforms to the ISOBUS standard. However, the baler control unit and the towing vehicle control unit may also be designed as the control unit, i.e. in particular may form an integrated control unit. The control unit can be assigned to the combination, in particular the towing vehicle or the baler or both together, and/or can be arranged on or in these. The control unit or the baler control unit and/or the towing vehicle control unit may be designed as an electronic module, an embedded system, a computing unit, a computer, a module for controlling and/or regulating the baler or the combination, in particular the towing vehicle and/or the baler. The control unit or the baler control unit and the towing vehicle control unit can comprise one or more processors, a memory and/or all software, hardware, algorithms, connections, in particular also sensors, which are necessary for controlling and/or regulating the combination. The methods may be designed as a program or algorithm which can be executed on and/or with the control unit or the baler control unit and the towing vehicle control unit. The control unit or the baler control unit and the towing vehicle control unit can comprise any unit that analyzes data from various sensors, compares data, and makes the decisions necessary to control and/or regulate and/or perform the operation of the combination or only the baler and the required tasks for controlling and/or regulating the operation of the combination. The control unit or the baler control unit and the towing vehicle control unit can be connected to the parts of the balers, i.e. in particular the baling unit and/or the pick-up unit and/or the GPS device, and/or the actuators, in particular their valves or valve arrangements, and/or the sensors, for example the bale sensor(s) and/or one or more wrapping sensors and/or the ejection flap sensor and/or the first and/or second sensor and/or the PTO sensor and/or the speed sensor, preferably connected for signalling and/or operatively coupled and/or connected for transmitting signals and/or conducting data. The towing vehicle control unit or the control unit may be connected to the parts of the towing vehicle, i.e. in particular the GPS device and/or a steering device and/or a steering actuator and/or the input and output unit and/or the capture device and/or the image processing system and/or all other sensors, preferably connected for signalling and/or operatively coupled and/or connected for transmitting signals and/or conducting data. The control unit may be connected to all the above-mentioned components of the baler control unit and towing vehicle control unit, in particular connected for signalling and/or operatively coupled and/or connected for transmitting signals and/or conducting data. Connected for signalling and/or operatively coupled and/or a connection for transmitting signals and/or conducting data can be understood as meaning, inter alia, that signals and/or data can be exchanged between the connected parts and the control unit or the baler control unit and/or the towing vehicle control unit. Signals can be received and sent and/or processed and/or handled by the baler control unit and the towing vehicle control unit or the control unit, for example. The connection between the control unit or the baler control unit and the towing vehicle control unit and the parts or components of the towing vehicle and/or the baler can be wired, i.e. in particular by cable, and/or wireless, i.e. by radio, for example using Bluetooth or WLAN. Communication may be for example by means of Isobus, CAN bus, or the like. The control unit or the towing vehicle control unit may be connected directly to the input and output unit which is arranged in a cab of the towing vehicle and by means of which data input by an operator can be transmitted to the baler control unit and/or the towing vehicle control unit or the control unit or received and output thereby. The baler control unit and/or the towing vehicle control unit or the control unit can be integrated in the input and output unit, or vice versa.

The above features and advantages and other features and advantages of the present teachings are readily apparent from the following detailed description of the best modes for carrying out the teachings when taken in connection with the accompanying drawings.

DETAILED DESCRIPTION

Figure 1:
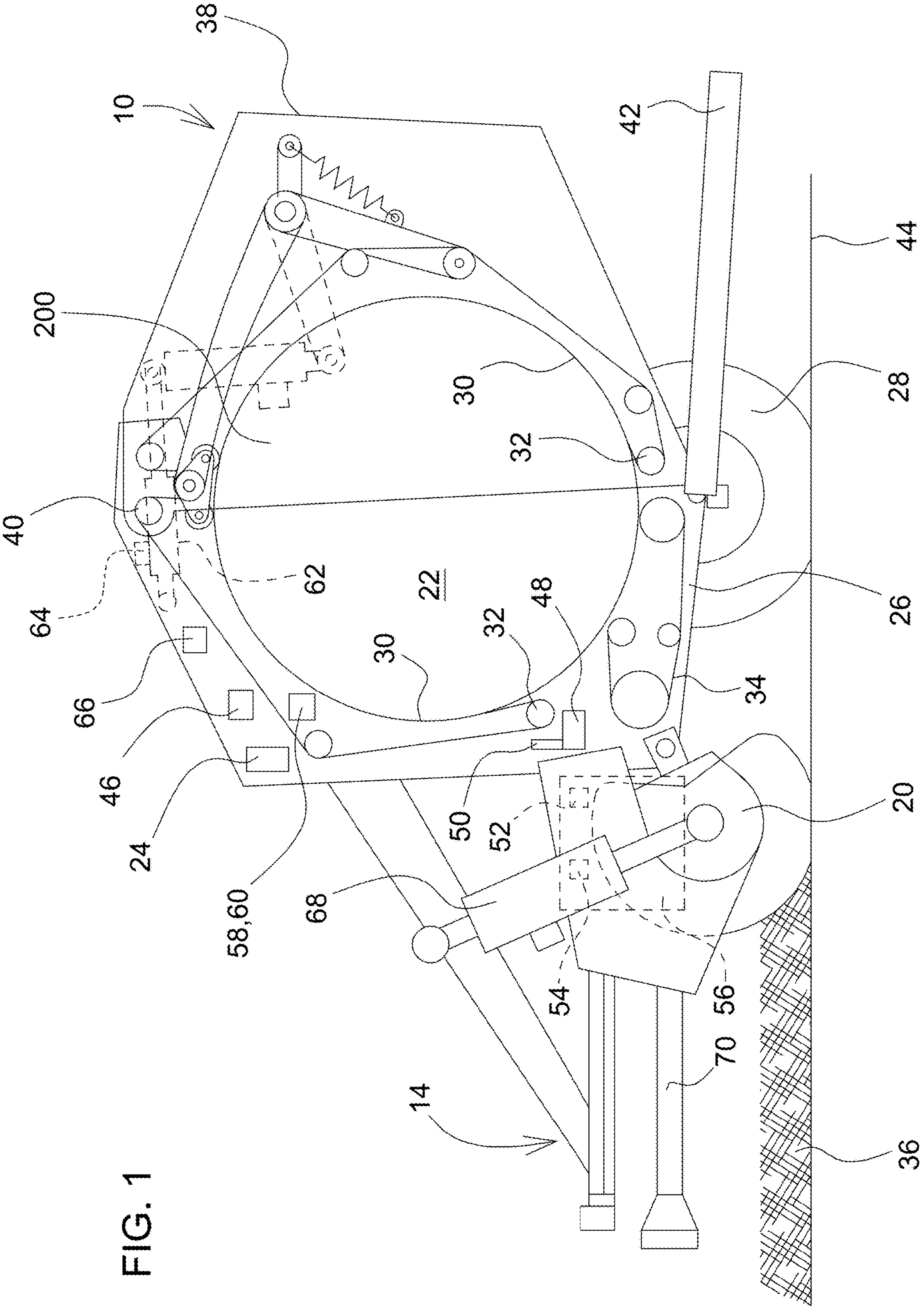
FIG. 1 is a schematic illustration of a first exemplary embodiment of a baler according to the disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

The terms "forward", "rearward", "left", and "right", when used in connection with a moveable implement and/or components thereof are usually determined with reference to the direction of travel during operation, but should not be construed as limiting. The terms "longitudinal" and "transverse" are usually determined with reference to the fore-and-aft direction of the implement relative to the direction of travel during operation, and should also not be construed as limiting.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a schematic illustration of a first exemplary embodiment of a baler is generally shown at 10. The baler 10 comprises a pick-up unit 20 for picking up crop from the ground and feeding the crop into a baling unit 22. The baler 10 also comprises the baling unit 22 in order to form or bale the picked-up crop into a bale 200. In particular, the baler 10 may comprise a baler control unit 24 or a control unit 104. The baler 10 can comprise a baler frame 26. The baler frame 26 can be supported on wheels 28. The baling unit 22 can be arranged at or on the baler frame 26, preferably connected to the latter and/or fastened to the latter and/or supported on the latter.

The baler 10 is designed with a variable-size baling unit 22 or baling chamber. The baling means 30 is designed as one or more bands or straps or belts. The baling means 30 surrounds the baling unit 22 or baling chamber and is guided by rollers 32. However, the baler 10 can also comprise a size-invariable baling unit 22 or baling chamber. In this case, the baling means can be designed as one or more baling rollers, in particular a multiplicity of baling rollers running parallel to one another, for baling the crop.

The pick-up unit 20, in particular in the form of a pick-up, is arranged on the baler 10 and/or connected thereto, in particular below the front edge of the baler 10. The pick-up unit 20 can comprise tines moving or rotating about a transverse axis. The pick-up unit 20 can be followed in a crop flow direction by a conveyor unit, presently a conveyor belt 34, of the baler 10. The conveyor belt 34 could also be replaced by a rotor (not shown), or a rotor could be inserted in the crop flow direction between the pick-up unit 20 and the conveyor belt 34. Instead of the pick-up unit 20, in particular the pick-up, other suitable crop pick-up means, such as mowing and conveyor units, could also be used. The pick-up unit 20 collects crop that is lying in the field, in particular in a swath 36 of grass, hay or straw, for example, and feeds the crop to the baling unit 22. The baling means 30 can be set in motion in the longitudinal direction thereof during a baling process by driving one or more of the rollers 32 in rotation. The crop introduced into the baling unit 22 therefore also rotates during baling. During the baling process, the size of the baling unit 22 increases over time. The baler 10 comprises an ejection unit 38, for example an ejection flap or a rear part or a tailgate of the baler 10. The ejection unit 38 is pivotably mounted on the baler 10, in particular on the baler frame 26 or on a housing part. The ejection unit 38 is pivotable about an axis 40 which extends transversely to the forward direction 300 of a towing vehicle 12 (see FIG. 2) and/or of the baler 10. The ejection unit 38 can be moved between a first position, in which the baling unit 22 is closed, and a second position, in which the baling unit 22 is open for the purpose of unloading the bale. In addition, the baler 10 may comprise a ramp 42 in order to deposit the bale 200 on the ground 44.

The baler 10 can comprise a wrapping unit 48. The wrapping unit 48 can be arranged on, in particular in the vicinity of, the baling unit 22. The wrapping unit 48 can be connected to the baler control unit 24 or the control unit 104. The baler control unit 24 or the control unit 104 may be configured to set and/or adjust the wrapping unit 48 in order to deliver a wrapping material, such as twine, tape, mesh or film, to the baling unit 22. The rotating bale 200 can pull on the wrapping material or trap same such that it is then wrapped around the bale 200. A wrapping sensor 50 can interact with the wrapping unit 48 and sense whether, for example, the bale 200 is pulling on the packaging or the wrapping process is complete.

The baling unit 22 can be driven with a first energy value and the pick-up unit 20 can be driven with a second energy value. The baler control unit 24 or the control unit 104 may be connected to the pick-up unit 20 and the baling unit 22, preferably connected for signalling and/or operatively coupled and/or connected for transmitting signals and/or conducting data.

The pick-up unit 20 and the baling unit 22 can be controlled and/or set and/or adjusted using the control unit or the baler control unit 24 or the control unit 104. The control unit 104 or the baler control unit 24 is configured to receive an energy consumption signal or a PTO consumption signal and to ascertain, in particular determine and/or calculate, a total energy value with the received signal. The control unit 104 or the baler control unit 24 is also configured to compare the total energy value with a baler consumption value, and to send a first actuating signal for setting and/or adjusting the total energy value if the total energy value is different from the baler consumption value.

Figure 2:
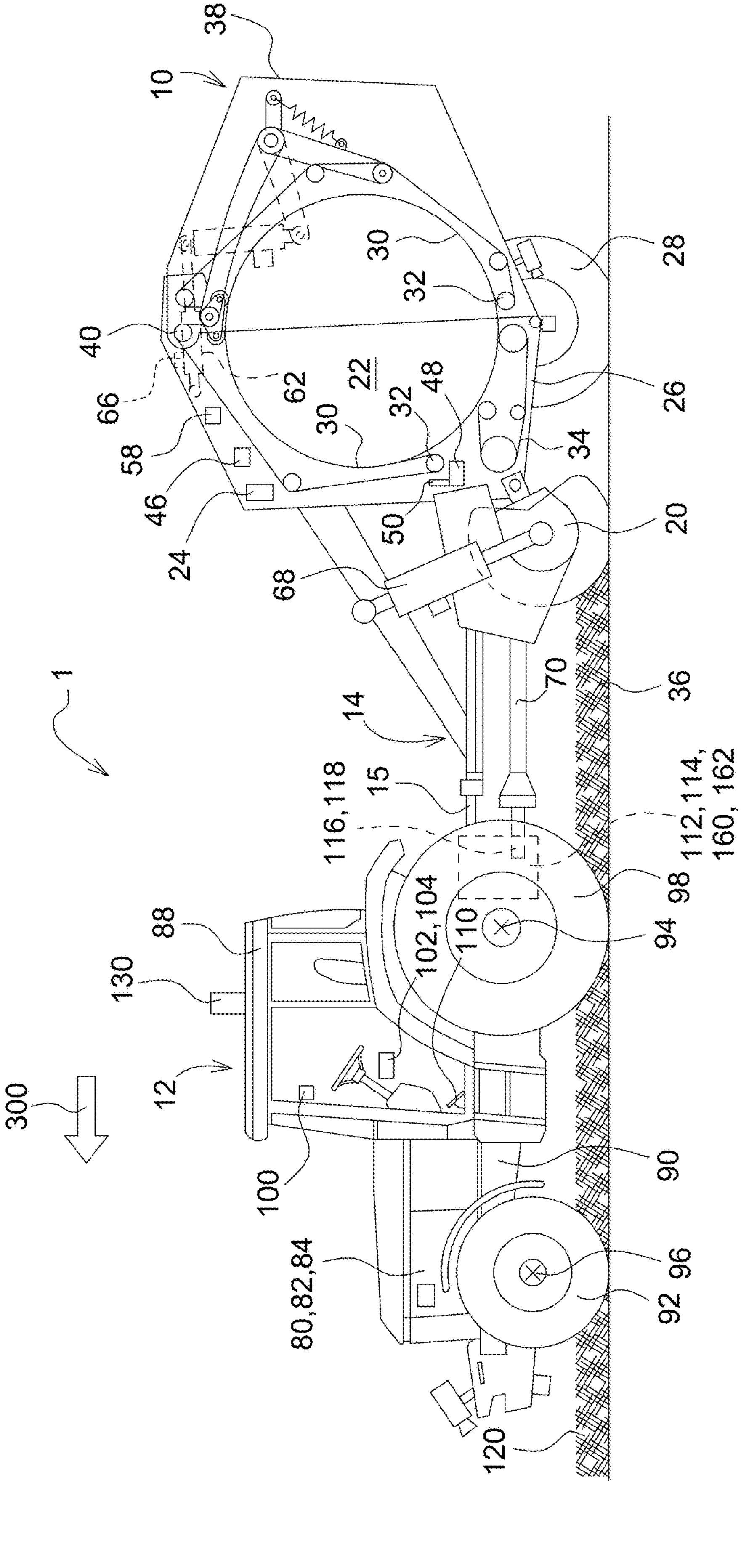
FIG. 2 is a schematic illustration of the first exemplary embodiment of a combination including a towing vehicle and the baler according to the disclosure.

FIG. 2 shows a schematic illustration of a first exemplary embodiment of a combination 1 according to the disclosure of a towing vehicle 12 and a baler 10 according to the disclosure pulled by the towing vehicle 12 by means of a drawbar 14, in particular according to FIG. 1. The baler 10 shown in FIG. 2 corresponds substantially to the baler 10 shown in FIG. 1, and therefore only details and/or differences are discussed below. The baler 10 shown in FIG. 1 may have the additional features and properties described below.

The towing vehicle 12 can comprise the drive train 80. The towing vehicle 12, in particular the drive train 80, may comprise the motor 82, for example an internal combustion engine or an electric motor. The towing vehicle 12, in particular the drive train 80, can also comprise a transmission unit 82, in particular a transmission. The combination 1, in particular the towing vehicle 12, comprises the input and output unit 100 and the control unit 104. However, the combination 1, in particular the towing vehicle 12, may also comprise the towing vehicle control unit 102. The baler control unit 24 and the towing vehicle control unit 102 may be integrated in the control unit 104. The control unit 104 or the towing vehicle control unit 102 may be arranged on or in the towing vehicle 12. The control unit 104 may have the structure and all functionalities and all connections of the baler control unit 24 and the towing vehicle control unit 102 and may control said sensors and/or actuators and/or valves and/or valve arrangements.

The drive train 80 and/or its components, for example the drive motor 82 and/or the transmission unit 84, can be connected to and/or controlled and/or set and/or adjusted by the control unit 104 or towing vehicle control unit 102. The control unit 104 or towing vehicle control unit 102 can be connected to the input and output unit 100, preferably connected for signalling and/or operatively coupled and/or connected for transmitting signals and/or conducting data. By means of the input and output unit 100 arranged in a cab 88 of the towing vehicle 12, data and/or commands input into the input and output unit 100 by an operator of the combination 1 can be transmitted to or received by the control unit 104 or the towing vehicle control unit 102. Likewise, data and/or commands can be output using the input and output unit 100.

The towing vehicle 12 can comprise a towing vehicle frame 90, in particular can be supported on the towing vehicle frame 90. The towing vehicle frame 90 can be supported on ground engagement means. The ground engagement means, shown here in the form of front wheels 92 and rear wheels 94, are engaged with a hard surface for transmitting drive forces, and/or the towing vehicle 12 is supported with these on the hard surface or ground. The ground engagement means, in particular the front wheels 92 and rear wheels 94, can be steerable and/or movable. The cab 24 can be supported by the towing vehicle frame 90. Moreover, an operator's workstation and/or the input and output unit 100 can be situated in the cab 24. The towing vehicle 12 comprises a front axle 96 and a rear axle 98. The rear axle 98 can be driven, in particular permanently, and the front axle 96 cannot be driven, in particular permanently, by the drive train 80, or can be driven in an activatable manner as required. The front axle 96 and/or in particular the rear axle 98 can be set and/or adjusted using a steering device, particularly preferably a steering actuator. The combination 1, in particular the towing vehicle 12, can be driven by or using the drive train 80, in particular the motor 82. For this purpose, the motor 82 can transmit a rotational speed and/or a torque to the front and/or rear axle 96, 98 and the ground engagement means via the transmission unit 84, with the result that the combination 1, in particular the towing vehicle 12, is driven. The towing vehicle 12 can also comprise, for example, an accelerator pedal 110 or a hand throttle lever not shown. Directional details, such as front and rear, left and right, hereunder refer to the forward direction 300 of the towing vehicle 12, which forward direction goes to the left in FIG. 2.

The baler 10 is connected, and/or in particular coupled, to the towing vehicle 12. The towing vehicle 12 is connected to the baler 10 by means of or using the drawbar 14. For example, the baler 10 can be coupled to a hitch 15 of the towing vehicle 12 using the drawbar 14. The towing vehicle 12 can pull the baler 10.

The control unit 104 is configured to receive or determine an energy consumption signal or a PTO consumption signal and to determine a total energy value with the energy consumption signal or the PTO consumption signal. The control unit 104 is also configured to compare the total energy value with a baler consumption value and to set and/or adjust a PTO unit 112 with or based on a first actuating signal if the total energy value is different from the baler consumption value. Alternatively, however, the baler control unit 24 and the towing vehicle control unit 102 can also take over this function. The towing vehicle control unit 102 may thus be configured to determine the energy consumption signal or the PTO consumption signal, and the baler control unit 24 may be configured to receive the energy consumption signal or the PTO consumption signal from the towing vehicle control unit 102.

The towing vehicle control unit 102 may thus be configured to determine the energy consumption signal or the PTO consumption signal, and the baler control unit 24 may be configured to receive the energy consumption signal or the PTO consumption signal from the towing vehicle control unit 102. The baler control unit 24 may also be configured to compare the total energy value with a baler consumption value, and to send the first actuating signal to the towing vehicle control unit 102 if the total energy value is different from the baler consumption value. The towing vehicle control unit 102 may be configured to set and/or adjust the PTO unit 112 with or based on the first actuating signal if the total energy value is different from the baler consumption value. The baler consumption value can be equal to the sum of the first and second energy values. The control unit 104 or the towing vehicle control unit 102 may be configured to increase an energy and/or a torque and/or a force and/or a rotational speed of the PTO unit 112, in particular a first energy machine 160 or an electric motor 162 of the PTO unit 112, thus increasing the total energy, in particular if the total energy value is less than or equal to the baler consumption value. The control unit 104 or the towing vehicle control unit 102 may be configured to reduce an energy and/or a torque and/or a force and/or a rotational speed of the PTO unit 112, in particular the first energy machine 160 or the electric motor 162 of the PTO unit 112, thus reducing the total energy, in particular if the total energy value is greater than the baler consumption value. In addition, the control unit 104 may be configured to set and/or adjust a speed of combination 1 with a driving signal if the total energy value is different from the baler consumption value. Alternatively, the baler control unit 24 may be configured to compare the total energy value with a baler consumption value, and to send the driving signal to the towing vehicle control unit 102 if the total energy value is different from the baler consumption value. The towing vehicle control unit 102 or the control unit 104 may be configured to set and/or adjust the combination 1, preferably the towing vehicle 12, particularly preferably the drive train 80, for example the motor 82 or the transmission or the transmission unit 84, with or based on the driving signal if the total energy value is different from the baler consumption value.

The control unit 104 or the towing vehicle control unit 102 may be configured to reduce an energy and/or a torque and/or a force and/or a rotational speed of the drive train 80, in particular the motor 82 or the transmission or the transmission unit 84, thus reducing the baler consumption value, in particular if the total energy value is less than or equal to the baler consumption value. The control unit 104 or the towing vehicle control unit 102 may be configured to increase an energy and/or a torque and/or a force and/or a rotational speed of the drive train 80, in particular the motor 82 or the transmission or the transmission unit 84, thus increasing the baler consumption value, in particular if the total energy value is greater than the baler consumption value. In addition, the control unit 104 may be configured to compare the total energy value with the baler consumption value and to set and/or adjust a density of the bale with a second actuating signal if the total energy value is different from the baler consumption value. Alternatively, the baler control unit 24 may be configured to compare the total energy value with a baler consumption value, and to set and/or adjust a density of the bale with the second actuating signal if the total energy value is different from the baler consumption value.

The towing vehicle control unit 102 or the control unit 104 may be configured to set and/or adjust the baler 10, preferably a first actuator 58, with or based on the second actuating signal if the total energy value is different from the baler consumption value. The control unit 104 or the towing vehicle control unit 102 may be configured to reduce an energy and/or a torque and/or a force of the first actuator 58, thus reducing the pressure or bale forming pressure, and thus, in particular, the baler consumption value, preferably the first energy value, in particular if the total energy value is less than or equal to the baler consumption value. The control unit 104 or the towing vehicle control unit 102 may be configured to increase an energy and/or a torque and/or a force of the first actuator 58, thus increasing the pressure or the bale forming pressure, and thus, in particular, the baler consumption value, preferably the first energy value, in particular if the total energy value is greater than the baler consumption value.

The towing vehicle 12 comprises the PTO unit 112. The PTO unit 112 may comprise in particular a PTO transmission 118 and/or a PTO 116 and/or the first energy machine 160 or the electric motor 162. The PTO unit 112 can be driven with the first energy machine 160, in particular the electric motor 162. The PTO unit 112 is mechanically connected to the baler 10 to drive the baling unit 22 and the pick-up unit 20. The towing vehicle 12 comprises the PTO sensor 114 for capturing, in particular for directly or indirectly capturing, the PTO consumption signal. The PTO sensor 114 may be connected to the towing vehicle control unit 102 or the control unit 104, preferably connected for signalling and/or operatively coupled and/or connected for transmitting signals and/or conducting data. The PTO sensor 114 can determine an energy and/or a torque and/or a speed at or in the PTO unit 112, in particular at or in a PTO transmission 118 and/or the PTO 116 and/or the first energy machine 160 or the electric motor 162, in particular in the form of a PTO consumption signal.

The control unit 104 or the towing vehicle control unit 102 may be configured to control an input and output unit 100 with or based on the driving signal, with the result that the input and output unit 100 signals to the operator to change a speed of the towing vehicle 12, or the input and output unit 100 is configured to signal to the operator to change a speed of the towing vehicle 12. Likewise, the towing vehicle control unit 102 or the control unit 104 may be configured to emit or send an operator signal to the input and output unit 100 of the towing vehicle 12 with or based on the driving signal, and the input and output unit may be configured to signal to the operator to change a speed of the towing vehicle 12. In particular, the baler control unit 24 or the control unit 104 may be configured to set an output size of the fully formed bale, wherein the output size defines when the fully formed bale is output.

The control unit 104, or alternatively the baler control unit 24 and the towing vehicle control unit 102, may be configured to set and/or adjust the PTO unit 112 with or based on the first actuating signal and/or to set and/or adjust a speed of the combination 1 with or based on the driving signal and/or to set and/or adjust a density of the bale with or based on the second actuating signal, and without changing the output size, if the total energy value is different from the baler consumption value. The output size may be a volume and/or diameter and/or a radius and/or a mass of the bale and/or a tension of the baling means and/or a distribution of the crop, in particular a lateral distribution of the crop, in the swath. Likewise, the baler control unit 24 or the control unit 104 may be configured to set and/or adjust, in particular maintain, a density of the bale with the second actuating signal if the first energy value is different from a presently required energy value of the baling unit 22.

The combination 1, in particular the baler 10, may comprise a first sensor 52 for capturing the first energy value of the baling unit 22 and the second energy value of the pick-up unit 20. The control unit 104 or the baler control unit 24 can be connected to the first sensor 52, preferably connected for signalling and/or operatively coupled and/or connected for transmitting signals and/or conducting data. Furthermore, the control unit 104 or the baler control unit 24 may be configured to determine the sum of the first and second energy values using the signal from the first sensor 52. Alternatively or additionally, the combination 1, in particular the baler 10, may comprise the first sensor 52 for capturing the first energy value of the baling unit 22 and a second sensor 54 for capturing the second energy value of the pick-up unit 20. In this case, the control unit may be connected to the first and second sensors 52, 54, preferably connected for signalling and/or operatively coupled and/or connected for transmitting signals and/or conducting data. In this case, the control unit 104 or the baler control unit 24 may be configured to determine the first and second energy values and the sum of the first and second energy values using the signals from the first and second sensors 52, 54. The baler 10 may also comprise a drive unit 56 which is mechanically connected to the baling unit 22 and the pick-up unit 20 and can be used to drive the baling unit 22 and pick-up unit 20.

The baler 10 may comprise one or more bale sensors 46, in order to capture the output size, in particular on or in the baling unit 22, or with which the output size is captured. The control unit 24 or the baler control unit 24 can be connected to the bale sensor 46, preferably connected for signalling and/or operatively coupled and/or connected for transmitting signals and/or conducting data. The control unit 24 or the baler control unit 24 can be connected to the bale sensor 46, for example by means of a cable, in particular by way of a releasable plug, or via a radio connection. The bale sensor 46 can be arranged on or in the baling unit 22, in particular fastened in the latter. The output size captured by the bale sensor 46 can be displayed, for example, to an operator on an input and output unit 100.

The combination 1, preferably the baler 10, particularly preferably the baling unit 22, comprises the first actuator 58 for setting and/or adjusting the baling unit 22. The first actuator 58 may be designed to set and/or adjust the baling unit 22, preferably the baling means, particularly preferably the pressure or the bale forming pressure of the baling means. The first actuator may be connected to the control unit 104 or the baler control unit 24, in particular connected for signalling and/or operatively coupled and/or connected for transmitting signals and/or conducting data. The baler 10, in particular the baling unit 22, comprises a first valve or a first valve arrangement 60, in particular a first control valve, for controlling and/or setting and/or adjusting the first actuator. The first valve or the first valve arrangement 60 may be connected to the control unit 104 or the baler control unit 24, in particular connected for signalling and/or operatively coupled and/or connected for transmitting signals and/or conducting data. The control unit 104 or the baler control unit 24 may be configured to set and/or adjust the baling unit 22, preferably the density of the bale, particularly preferably the pressure or bale forming pressure of the baling means, on the basis of the second actuating signal, in particular if the total energy value is different from the baler consumption value. The first actuator 58 is in the form of a hydraulic cylinder.

The control unit 24 or the baler control unit 24 can be connected to a second actuator 62, in particular a hydraulic cylinder, preferably connected for signalling and/or operatively coupled and/or connected for transmitting signals and/or conducting data. The control unit 24 can be connected to the second actuator 62, in particular via a valve or a second valve arrangement 64. The ejection unit 38 can be moved by means of the second actuator 62 between the first position, in which the baling unit 22 is closed, and the second position, in which the baling unit 22 is open for the purpose of unloading the bale. The second actuator 62 in the form of a hydraulic cylinder is connected, in particular pivotably connected or fastened, at one end to the baler 10, for example to the baler frame 26 or the housing, and at a second end to the ejection unit 38. However, the ejection unit 38 can also be pivotably articulated, i.e. pivotably fastened to a pivot point. The second actuator 62 can be connected to the ejection unit 38 in such a manner that it can pivot the ejection unit 38 upward about the axis 40 (counterclockwise in FIG. 1), thus enabling the bale 200 to be ejected from the baling unit 22. The ejection unit 38 can thus be opened or closed or raised and lowered by the second actuator 62. The second actuator 62 can be set and/or adjusted and/or controlled by means of the control unit 104 or the baler control unit 24 using or via the valve arrangement 64, for example via an electromagnetic or hydraulic valve arrangement. In this case, the valve arrangement 64 can be set and/or adjusted and/or controlled by means of the control unit 104 or the baler control unit 24. An ejection flap sensor 66 can capture, for example, the position of the second actuator 62 or of the ejection unit 38. The ejection unit 38, in particular the second actuator 62, can be operated, in particular set and/or adjusted and/or controlled, by means of the baler control unit 24 in such a way that the ejection unit 38, in particular the second actuator 62, is moved between a first position (baler closed) and a second position (baler open).

The pick-up unit 20 can be raised and lowered, for example, by means of a third actuator 68, here in the form of a hydraulic cylinder. The third actuator 68 can be set and/or adjusted and/or controlled by means of the control unit 104 or the baler control unit 24, for example via a third valve arrangement or a third valve (not illustrated). The third valve arrangement can be, for example, a hydraulic or electromagnetic valve arrangement. The third valve arrangement can be set and/or adjusted and/or controlled by means of the control unit 104 or the baler control unit 24.

The combination 1, preferably the towing vehicle 12, can comprise a capture device 120, here designed as a camera. The capture device 120 can be mounted on the front side of the towing vehicle 12, as shown. The capture device 120 is directed at the swath 36. The capture device 120, or the camera, delivers a capture signal or a video signal to the towing vehicle control unit 102 or the control unit 104 or an image processing system (not shown). The capture signal or video signal can be processed in the image processing system. The image processing system can be designed in particular as part of the towing vehicle control unit 102 or the control unit 104, so as to provide electronic information about the position of the towing vehicle 12 with respect to the swath 36. The image processing system can also determine a target line of the swath, in particular a longitudinal center axis of the swath.

Likewise, the image processing system can send a steering signal to a steering controller of the combination 1 and/or the towing vehicle control unit 102 or the control unit 104, and/or the towing vehicle control unit 102 or the control unit 104 can receive the steering signal. However, the steering signal can also be produced or generated by the towing vehicle control unit 102 or the control unit 104 with or on the basis of the capture signal or the target line of the swath. The towing vehicle control unit 102 or the control unit 104 may comprise a steering controller or the steering controller may be designed as part of the towing vehicle control unit 102 or the control unit 104, that is to say may be integrated in the towing vehicle control unit 102 or the control unit 104. As a result, the towing vehicle control unit 102 or the control unit 104 can steer the combination 1 along the swath 36, in particular the target line of the swath or the longitudinal center axis of the swath.

The combination 1, in particular the towing vehicle 12, can also comprise a GPS device 32 for determining the position of the combination 1 in the form of a position signal. The towing vehicle control unit 102 or the control unit 104 is connected to the GPS device 130. The towing vehicle control unit 102 or the control unit 104 receives the position signal from the GPS device 130. Position data can thus be sent and/or received, and/or in particular calculated, by means of the GPS device 130 or the towing vehicle control unit 102 or the control unit 104. For example, the GPS device 32 can comprise a GPS antenna, which receives position data, and a memory. The position of the swath 36, which is known from previous operations, may be stored in the memory of the GPS device 130 or the towing vehicle control unit 102 or the control unit 104. The combination 1, in particular the towing vehicle 12, can then be steered such that the position of the combination 1 or of the towing vehicle 12, as provided by the GPS device 130, and the position of the swath 36 from the memory match. Steering data could also be determined and/or ascertained and/or calculated by the towing vehicle control unit 102 or the control unit 104 and/or by the steering controller. An advantage of the present disclosure is that an overload or underload of the baler 10 or the combination 1 can be avoided.

Figure 3:
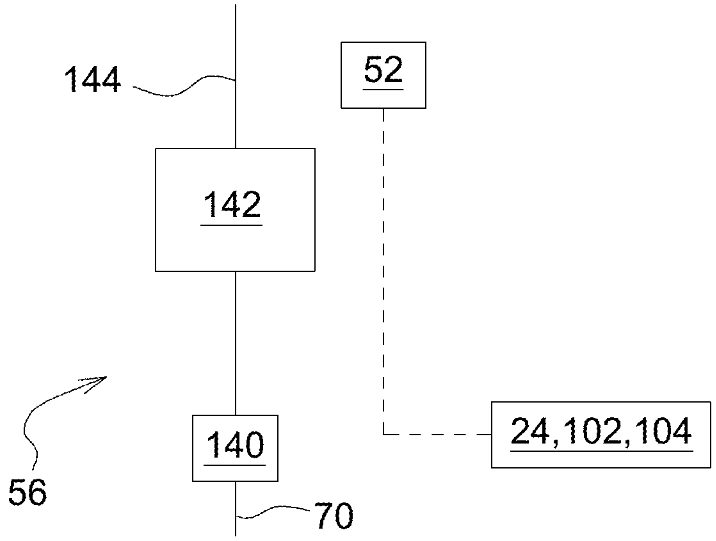
FIG. 3 is a schematic illustration of a first exemplary embodiment of a drive unit of the combination according to the disclosure.

FIG. 3 shows a schematic illustration of a first exemplary embodiment of a drive unit 56 of the baler 10 according to the disclosure. The balers 10 shown in FIGS. 1 and 2 may then comprise the drive unit 56 shown in FIG. 3.

The baler 10 comprises a drive unit 56 which is mechanically connected to the baling unit 22 and the pick-up unit 20 and can be used to drive the baling unit 22 and the pick-up unit 20. The drive unit 56 comprises the input shaft 70 and an optional overload clutch 140 and an output shaft 144, wherein the baling unit 22 and the pick-up unit 20 can be driven by or using the drive unit 56 with the output shaft 144. The drive unit 56 can be driven by or using the PTO unit 112. In particular, the input shaft 70 may be mechanically connected to the PTO 116 and/or can be driven by or using the PTO 116. The optional overload clutch 140 may be arranged on or in the input shaft 70, or the input shaft 70 may comprise the overload clutch. In addition, the drive unit 56 comprises an optional transmission device 142. The transmission device 142 is mechanically connected to the input shaft 70 and/or can be driven via or with the input shaft 70. The transmission device is mechanically connected to the output shaft 144.

The combination, in particular the baler 10, may comprise a first sensor 52 for capturing the first energy value of the baling unit 22 and for capturing the second energy value of the pick-up unit 20. The control unit 104 or the baler control unit 24 is connected to the first sensor 52, preferably connected for signalling and/or operatively coupled and/or connected for transmitting signals and/or conducting data. The control unit 104 or the baler control unit 24 is configured to determine the sum of the first and second energy values, in particular on the output shaft 144 or the transmission unit of the drive unit, using the signal from the first sensor 52.

Figure 4:
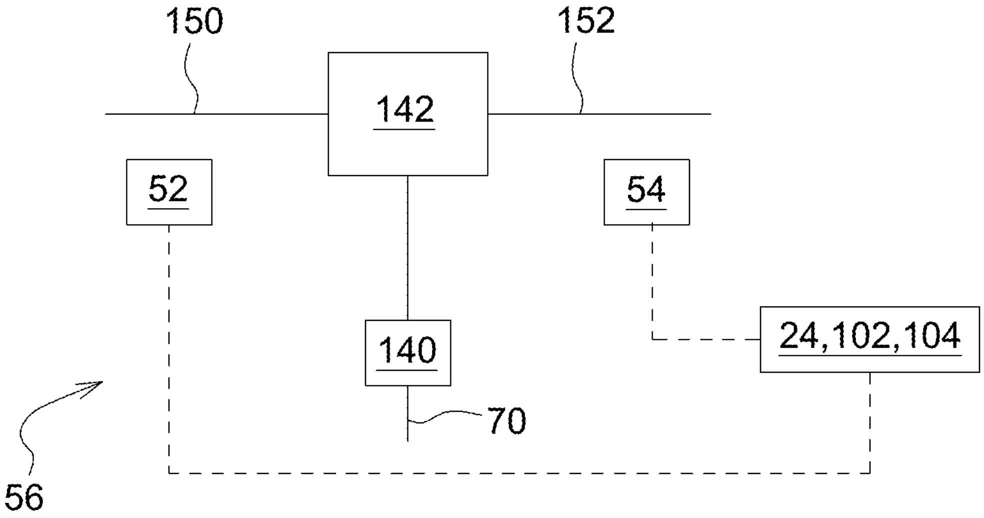
FIG. 4 is a schematic illustration of a further exemplary embodiment of a drive unit of the combination according to the disclosure.

FIG. 4 shows a schematic illustration of a further exemplary embodiment of a drive unit 56 of the baler 10 according to the disclosure. The balers 10 shown in FIGS. 1 to 2 may comprise the drive unit 56 shown in FIG. 4. The drive unit 56 shown in FIG. 4 corresponds substantially to the drive unit 56 shown in FIG. 3, and therefore only details and/or differences are discussed below.

The drive unit 56 comprises the input shaft 70 and the optional overload clutch 140 and a first and a second drive shaft 150, 152. In this case, the baling unit 22 can be driven by or using the drive unit with the first drive shaft 150, in particular with a first energy value. The pick-up unit 20 can be driven by or using the drive unit 56 with the second drive shaft 152, in particular with the second energy value. The transmission device 142 can be mechanically connected to the first and/or second drive shaft 150, 152. The first and/or second drive shaft 150, 152 may be driven via or with the transmission device 142. The baler 10 comprises a first sensor 52 for capturing the first energy value of the baling unit 22 and a second sensor 54 for capturing the second energy value of the pick-up unit 20. The control unit 104 or the baler control unit 24 is connected to the first and second sensors 52, 54, preferably connected for signalling and/or operatively coupled and/or connected for transmitting signals and/or conducting data.

The control unit 104 or the baler control unit 24 is configured to determine the first and second energy values and the sum of the first and second energy values using or with the signals from the first and second sensors 52, 54. The first energy value can therefore be determined with the first sensor 52 on the first drive shaft 150 of the drive unit 56 and the second energy value can be determined with the second sensor 54 on a second drive shaft 152 of the drive unit 56.

Figure 5:
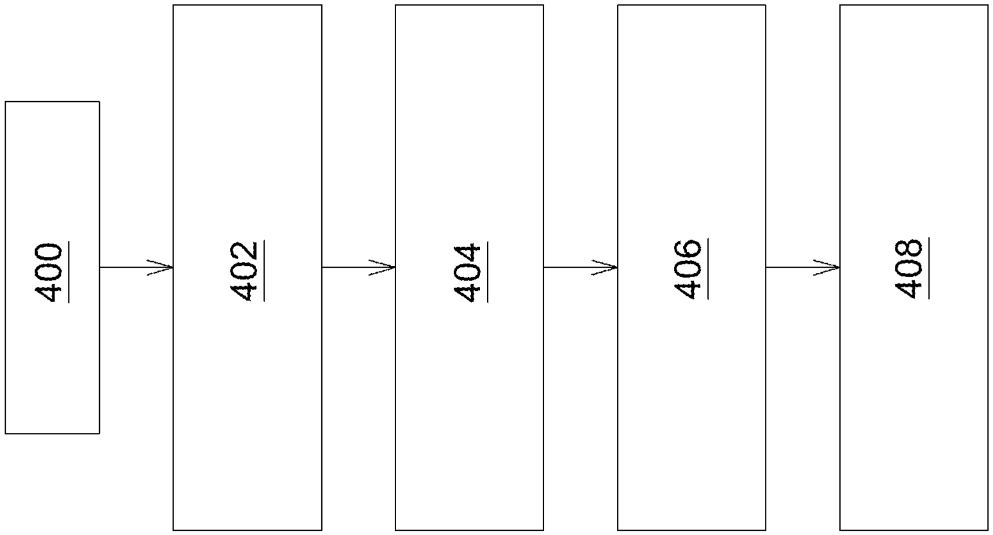
FIG. 5 is a schematic flowchart of the method according to the disclosure for operating the baler or the combination.

FIG. 5 shows a schematic flowchart of the method according to the disclosure for operating the baler 10 according to the disclosure or the combination 1 according to the disclosure. The operating mode shown in FIG. 5 can be carried out with the balers 10 and/or combinations 1 shown in FIGS. 1 to 4.

The start in step 400 is followed by step 402 in which the towing vehicle control unit 102 or the control unit 104 determines an energy consumption signal or a PTO consumption signal. The towing vehicle control unit 102 can transmit, in particular send, the energy consumption signal or the PTO consumption signal to the baler control unit 24, and the energy consumption signal or the PTO consumption signal can be received by the baler control unit 24. In the following step 404, the baler control unit 24 or the control unit 104 uses the received signal to determine a total energy value and compares the total energy value with a baler consumption value.

In step 406, the PTO unit 112 is set and/or adjusted with or based on the first actuating signal if the total energy value is different from the baler consumption value. Alternatively, the baler control unit 24 can send the first actuating signal and the towing vehicle control unit 102 receives the first actuating signal. The towing vehicle control unit 102 can set and/or adjust the PTO unit 112 with or based on the first actuating signal.

In addition, according to the optional step 408, the towing vehicle control unit 102 or the control unit 104 can set and/or adjust a speed of the towing vehicle 12 with or based on the driving signal. Likewise, the baler control unit 24 or the control unit 104 can set and/or adjust a density of the bale with or based on the second actuating signal.

As a result, an overload or underload of the baler 10 or the combination 1 can be advantageously avoided and the operation of the baler 10 or combination 1 can be optimized.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A combination comprising:

a towing vehicle including a drive train and a PTO unit;

a baler including a pick-up unit for picking up crop from the ground and feeding the crop into a baling unit, wherein the baling unit is configured for receiving the crop from the pick-up unit and forming the crop into a bale;

a control unit connected to the PTO unit, wherein the PTO unit is mechanically connected to the baler to drive the baling unit and the pick-up unit, wherein the baling unit can be driven with a first energy value and the pick-up unit can be driven with a second energy value;

wherein the control unit is configured to:

set a speed of the towing vehicle with the drive train;

receive or determine at least one of an energy consumption signal or a PTO consumption signal;

determine a total energy value from the energy consumption signal or the PTO consumption signal, wherein the total energy value is the maximum energy currently available for transfer from the PTO unit of the towing vehicle to the baler;

determine a baler consumption value, wherein the baler consumption value is a current total energy demand of the baler;

compare the total energy value with the baler consumption value to determine if the total energy value is different from the baler consumption value;

define a first actuating signal for controlling the PTO unit when the total energy value is different from the baler consumption value; and send a driving signal to adjust the speed of the towing vehicle with the drive train when the total energy value is different from the baler consumption value.

2. The combination set forth in claim 1, wherein the control unit is configured to define a density of the bale with a second actuating signal when the total energy value is different from the baler consumption value.

3. The combination set forth in claim 1, wherein the baler consumption value is equal to a sum of the first energy value and the second energy value.

4. The combination set forth in claim 1, further comprising a first sensor for capturing the first energy value of the baling unit and for capturing the second energy value of the pick-up unit, wherein the control unit is connected to the first sensor, and the control unit is configured to determine the sum of the first and second energy values using the signal from the first sensor.

5. The combination set forth in claim 1, further comprising a first sensor for capturing the first energy value of the baling unit and a second sensor for capturing the second energy value of the pick-up unit, wherein the control unit is connected to the first and second sensors, and the control unit is configured to determine the first and second energy values and the sum of the first and second energy values using the signals from the first and second sensors.

6. The combination set forth in claim 1, further comprising a drive unit mechanically connected to the baling unit and the pick-up unit and can be used to drive the baling unit and the pick-up unit.

7. The combination set forth in claim 5, wherein the first energy value can be determined with the first sensor on a first drive shaft of the drive unit and the second energy value can be determined with the second sensor on a second drive shaft of the drive unit.

8. The combination set forth in claim 1, wherein when the total energy value is different from the baler consumption value, the control unit is configured to:

set an output size of the fully formed bale, wherein the output size defines when the fully formed bale is output;

set and/or adjust the PTO unit with the first actuating signal;

set and/or adjust a speed of the towing vehicle with a driving signal and set and/or adjust a density of the bale with a second actuating signal.

9. The combination set forth in claim 8, wherein the output size is defined by one of a volume of the bale, a diameter of the bale, a radius of the bale, a mass of the bale, a tension of the baling means, or a distribution of the crop, in particular a lateral distribution of the crop, in the swath.

10. The combination set forth in claim 2, wherein the control unit is configured to set a density of the bale with the second actuating signal when the first energy value is different from a presently required energy value of the baling unit.

11. The combination set forth in claim 1, wherein the control unit is configured to control an input and output unit based on the driving signal, with the result that the input and output unit signals to the operator to change the speed of the towing vehicle.

12. A baler comprising:

a pick-up unit for picking up crop from the ground and feeding the crop into a baling unit, wherein the baling unit is configured for receiving the crop from the pick-up unit and forming the crop into a bale;

a control unit configured for connection to a PTO unit of a towing vehicle for driving the pick-up unit and the baling unit, wherein the baling unit can be driven with a first energy value and the pick-up unit can be driven with a second energy value;

wherein the control unit is configured to:

set a speed of a towing vehicle;

receive or determine at least one of an energy consumption signal or a PTO consumption signal;

determine a total energy value from the energy consumption signal or the PTO consumption signal, wherein the total energy value is the maximum energy currently available for transfer from the PTO unit of the towing vehicle to the baler;

determine a baler consumption value, wherein the baler consumption value is a current total energy demand of the baler;

compare the total energy value with the baler consumption value to determine if the total energy value is different from the baler consumption value;

define a first actuating signal for controlling the PTO unit when the total energy value is different from the baler consumption value; and send a driving signal to adjust the speed of the towing vehicle when the total energy value is different from the baler consumption value.

13. The baler set forth in claim 12, wherein the control unit is configured to define a density of the bale with a second actuating signal when the total energy value is different from the baler consumption value.

14. The baler set forth in claim 12, further comprising a first sensor for capturing the first energy value of the baling unit and for capturing the second energy value of the pick-up unit, wherein the control unit is connected to the first sensor, and the control unit is configured to determine the sum of the first and second energy values using the signal from the first sensor.

15. The baler set forth in claim 12, further comprising a first sensor for capturing the first energy value of the baling unit and a second sensor for capturing the second energy value of the pick-up unit, wherein the control unit is connected to the first and second sensors, and the control unit is configured to determine the first and second energy values and the sum of the first and second energy values using the signals from the first and second sensors.

16. A method of operating a combination of a towing vehicle and a baler, the method comprising:

setting a drive speed of the towing vehicle with a drive train of the towing vehicle;

determining at least one of an energy consumption signal or a PTO consumption signal of the baler;

determining a total energy value from the energy consumption signal or the PTO consumption signal, wherein the total energy value is the maximum energy currently available for transfer from the PTO unit of the towing vehicle to the baler;

determine a baler consumption value, wherein the baler consumption value is a current total energy demand of the baler;

comparing the total energy value with the baler consumption value to determine if the total energy value is different from the baler consumption value;

defining and communicating a first actuating signal for controlling a PTO unit of the towing vehicle when the total energy value is different from the baler consumption value; and sending a driving signal to adjust the speed of the towing vehicle with the drive train when the total energy value is different from the baler consumption value.

* * * * *